United States Patent [19]

Weber

[11] 4,166,325

[45] Sep. 4, 1979

[54] DIDACTIC APPARATUS INCLUDING HANDHELD RESPONSOR MEANS

[76] Inventor: Harold J. Weber, 20 Whitney Dr., Sherborn, Mass. 01770

[21] Appl. No.: 889,490

[22] Filed: Mar. 22, 1978

[51] Int. Cl.² .............................................. G09B 7/06
[52] U.S. Cl. ...................................................... 35/9 C
[58] Field of Search ......................................... 35/9 C

[56] References Cited

U.S. PATENT DOCUMENTS

| | | | |
|---|---|---|---|
| 3,057,082 | 10/1962 | Wellington et al. | 35/9 C |
| 3,100,352 | 8/1963 | Boissevain | 35/9 C |
| 3,740,869 | 6/1973 | Pleasants | 35/9 C |

*Primary Examiner*—William H. Grieb

[57] ABSTRACT

A didactic, or teaching, apparatus upon which interrogatory documents, or test sheets, may be placed in the manner of an overlay on the face side of the machine. The interrogatory document, which contains at least one interrogative statement, or question, together with at least two alternative responses, or answers, will be visibly illuminated from behind by an arrangement of light emitting devices. The light will fall on the document from behind so as to distinctly transilluminate the document in the several areas occupied by the alternative responses. The several areas of the alternative responses are, at the same time, caused to individually cooperate with several coupling devices, wherein one separate coupling device is provided for each of the several alternative responses. The student continues the didactic activity by electing one alternative response, for each interrogatory statement, whereupon he places a handheld, pen-like, probe containing a portable coupling means which is responsively interactive with any one of the several coupling devices affixed to the machine. Cooperation is accomplished betwixt the selected coupling device and the portable, variously positioned, coupling means so as to cause the machine to respond to the student's choice through making a comparison of the choice with a signal pattern indicating proper choices which is derived from a unique, cipher-like, indicia present on each interrogatory document which may be meaningfully read by the machine, but not the student.

14 Claims, 32 Drawing Figures

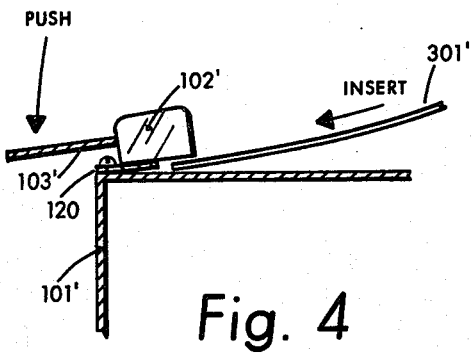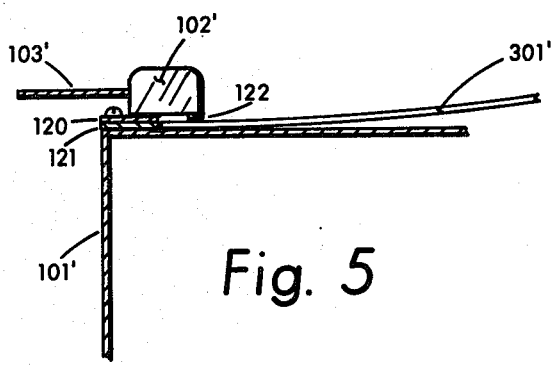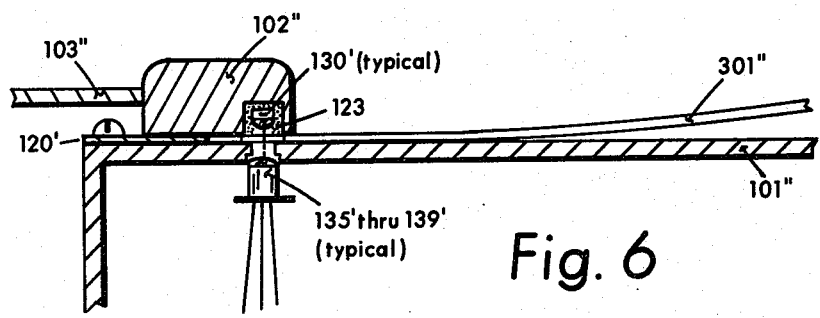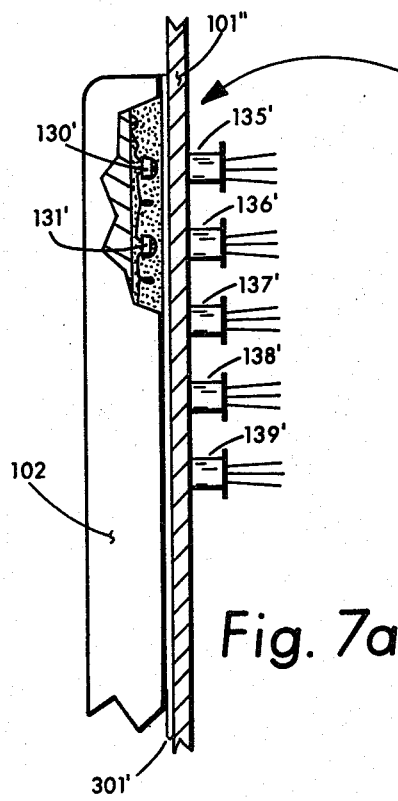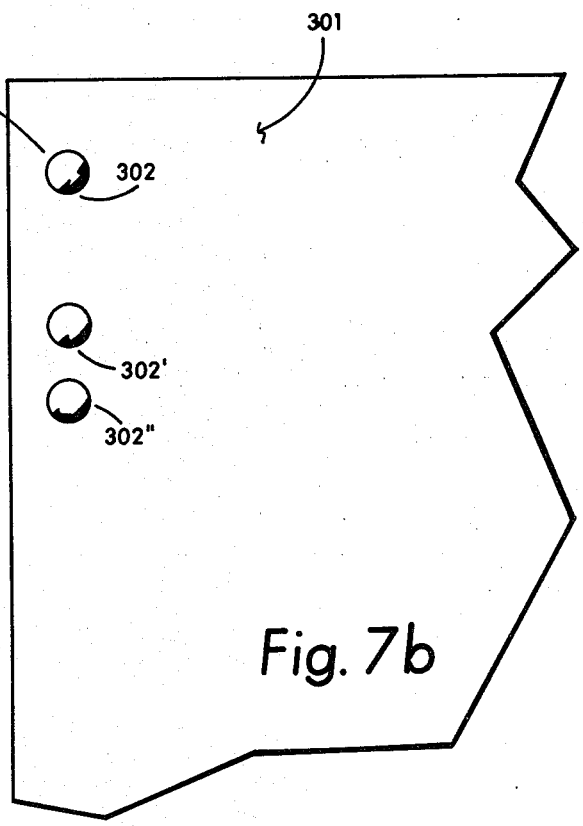

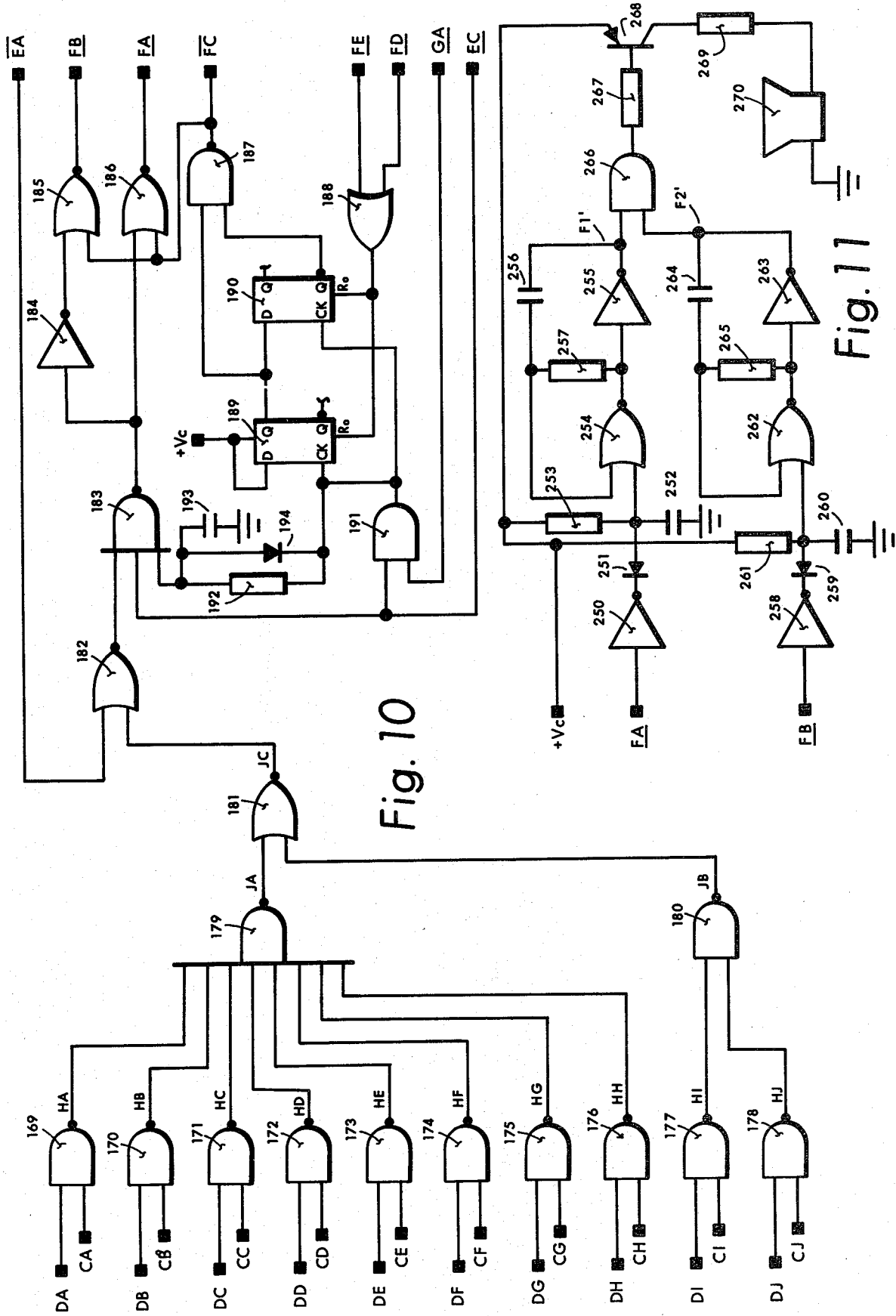

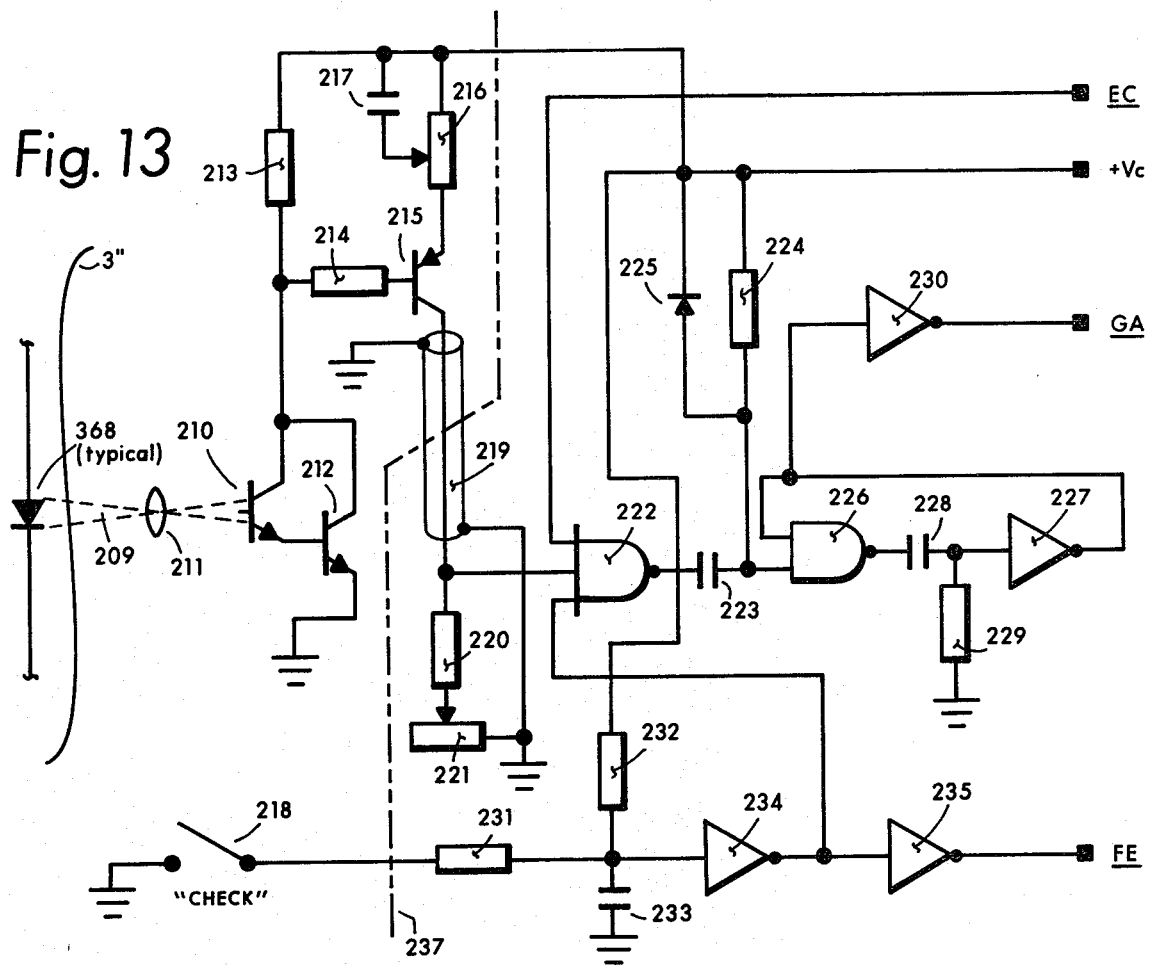
Fig. 13
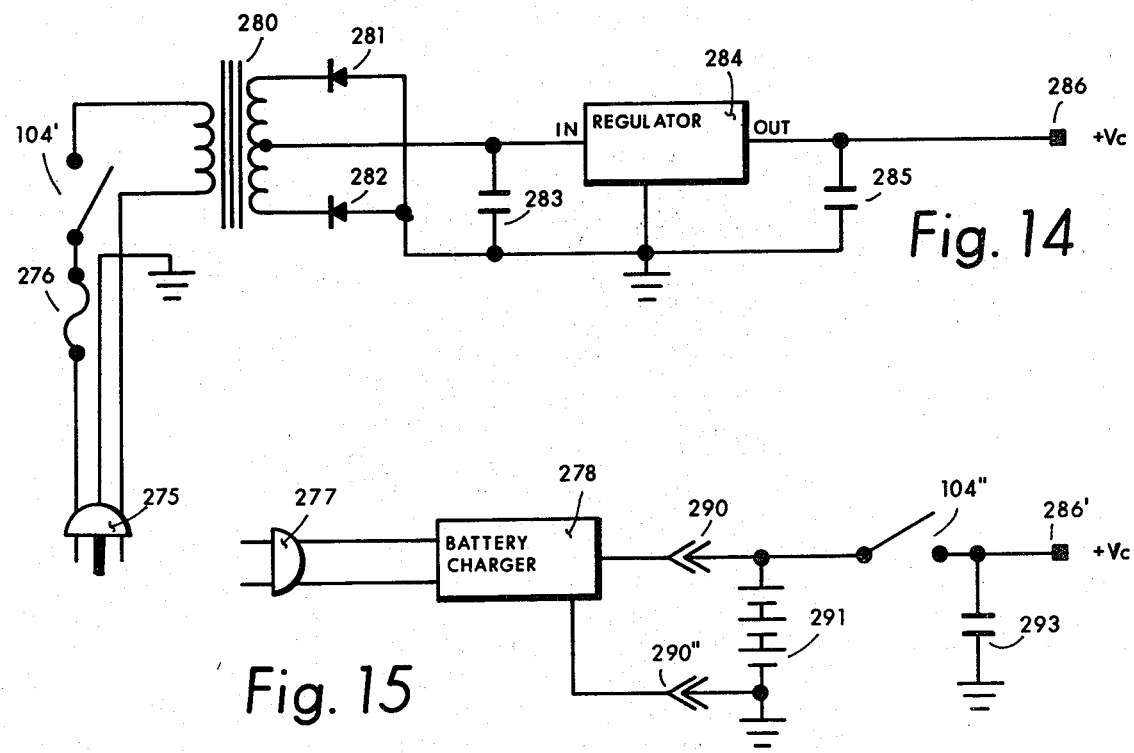
Fig. 14
Fig. 15

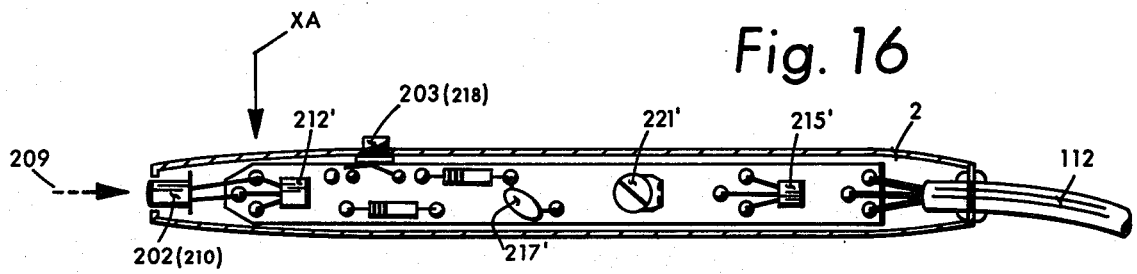
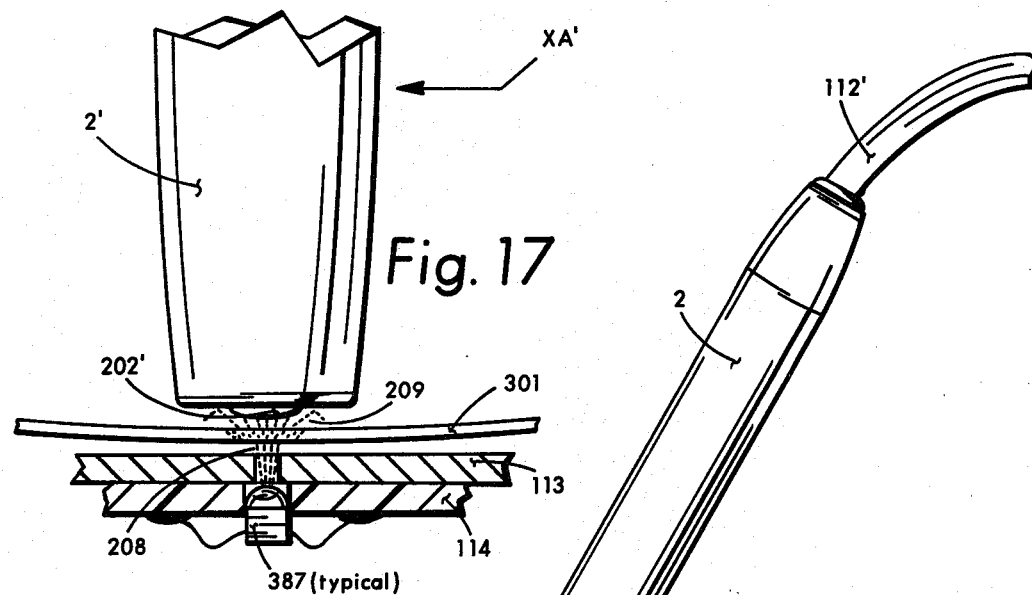
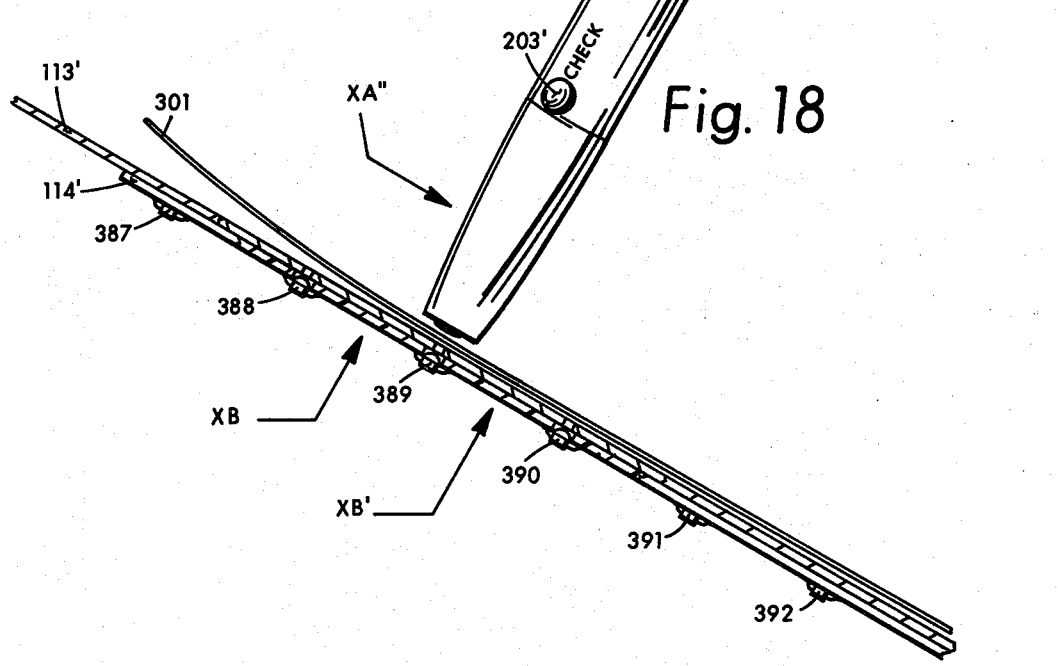

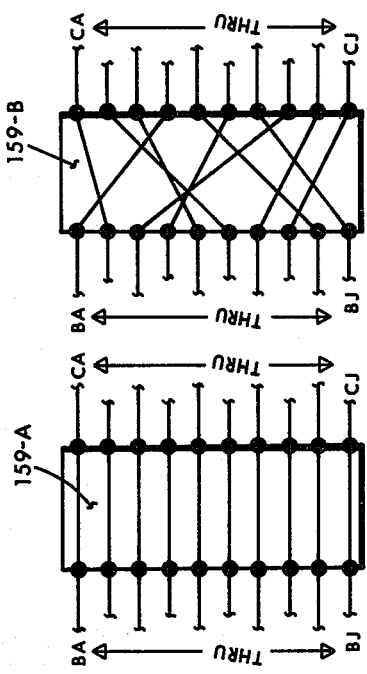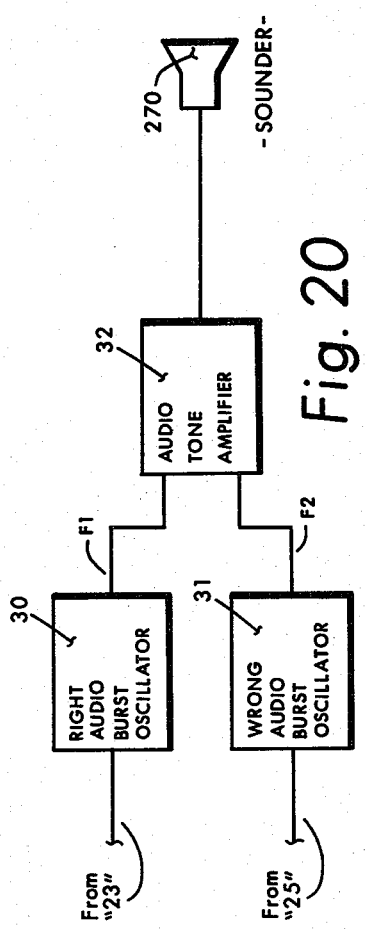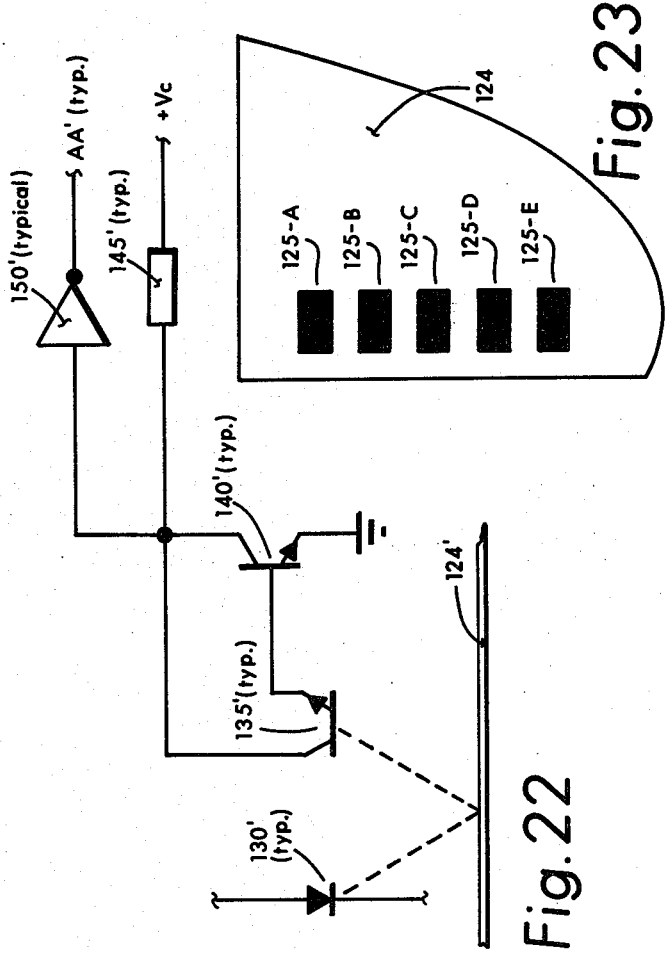

4,166,325

DIDACTIC APPARATUS INCLUDING HANDHELD RESPONSOR MEANS

SUMMARY

This apparatus encompasses a new combination of means for providing a meaningful learning experience which encourages a level of physical participation by a student akin to, but believed to be better than, marking correct and incorrect answers on a test sheet containing questions with multiple choice answers. The activity is believed to be better because the machine and the student are caused to interact in a dynamic way, as opposed to the static, therefore usually dull, way of more ordinary methods such as marked papers. Such dynamic, interactive interplay between the student and the didactic machine encourages enhanced student interest, prolonged involvement, and thereby a learning experience improvement. In the manner that, in cooperation with the machine, the test sheet is "smarter" than the student, the student can be reasonably expected to find this a challenge and thereby exhibit prolonged interest with the teaching capability of such a didactic means for a much longer period of time, and with greater intensity, than what more ordinary known means encourage. The test sheet is said to be "smarter" for the reason that, through the inclusion of a coded, cipher like, indicia only the machine finds meaningful, a wide variety of answer combinations may be arranged for each of a large number of different test sheets.

The student's participation is further encouraged by employing a response selection means which includes a pen-like probe device which must be grasped and purposefully positioned in direct relationship with the student selected answer thereby providing a more direct interactive relationship between the student and the instructional matter than what less direct methods, such as keyboard entry means, are believed to provide.

REFERENCE TO DRAWINGS

FIG. 1 Frontal view of the second apparatus, including first apparatus shown with a typical first instruction means visible.

FIG. 2 Block diagram showing functions for a particular preferred embodiment of the instant invention.

FIG. 3 Side view showing skeletal illustration for parts placement in the illustrative form for the invention.

FIG. 4 Detail of second apparatus means for receiving first apparatus.

FIG. 5 Detail of second apparatus with first apparatus shown received.

FIG. 6 Cross sectional view of second apparatus receptor means interactively employed with first apparatus second instruction means.

FIG. 7a View including partial cutaway showing typical second apparatus receptor means.

FIG. 7b View of face side of first apparatus showing detail of typical illustrative transmissive second instruction means.

FIG. 8 Circuits showing master clock and second apparatus answer display coupling device drive means.

FIG. 9 Circuits showing second apparatus receptor means including program patch means.

FIG. 10 Circuits showing fourth apparatus comparative means in one modeled form.

FIG. 11 Circuits for audible scoring means.

FIG. 12 Circuits for tally scoring means.

FIG. 13 Circuits for one form of third apparatus protable coupling means wherein photoelectric coupling is employed.

FIG. 14 One form of mains operated power supply.

FIG. 15 One form of mains rechargeable portable power supply.

FIG. 16 Illustrative view of third apparatus internal means.

FIG. 17 Detail showing second apparatus coupling device coupling through transillumination of the first apparatus and thereby acting on third apparatus coupling means.

FIG. 18 Detail showing relative cooperative relationship of first, second, and third apparatus.

FIG. 19 Timing diagram showing signal sequences in the exampled embodiment.

FIG. 20 Partial block diagram for audible scoring means.

FIGS. 21a, 21b, and 21c Typical program patch connections illustrative of various possibilities.

FIG. 22 Connection for reflective second apparatus receptor means.

FIG. 23 Detail of typical first apparatus reflective second instruction means.

FIG. 24 Detail of third apparatus contactual coupling means.

FIG. 25 Detail, including cutaway, of second apparatus coupling devices using contactual coupling.

FIG. 26 Detail of first apparatus showing aperatures for second apparatus contactual coupling device access.

FIG. 27 Circuit detail showing connections for third apparatus when used with contactual coupling means.

FIG. 28 Circuit detail for driving second apparatus contactual coupling devices.

FIG. 29 Circuit detail for driving second apparatus replication indicants.

DESCRIPTION OF PREFERRED EMBODIMENT

Figure 1:
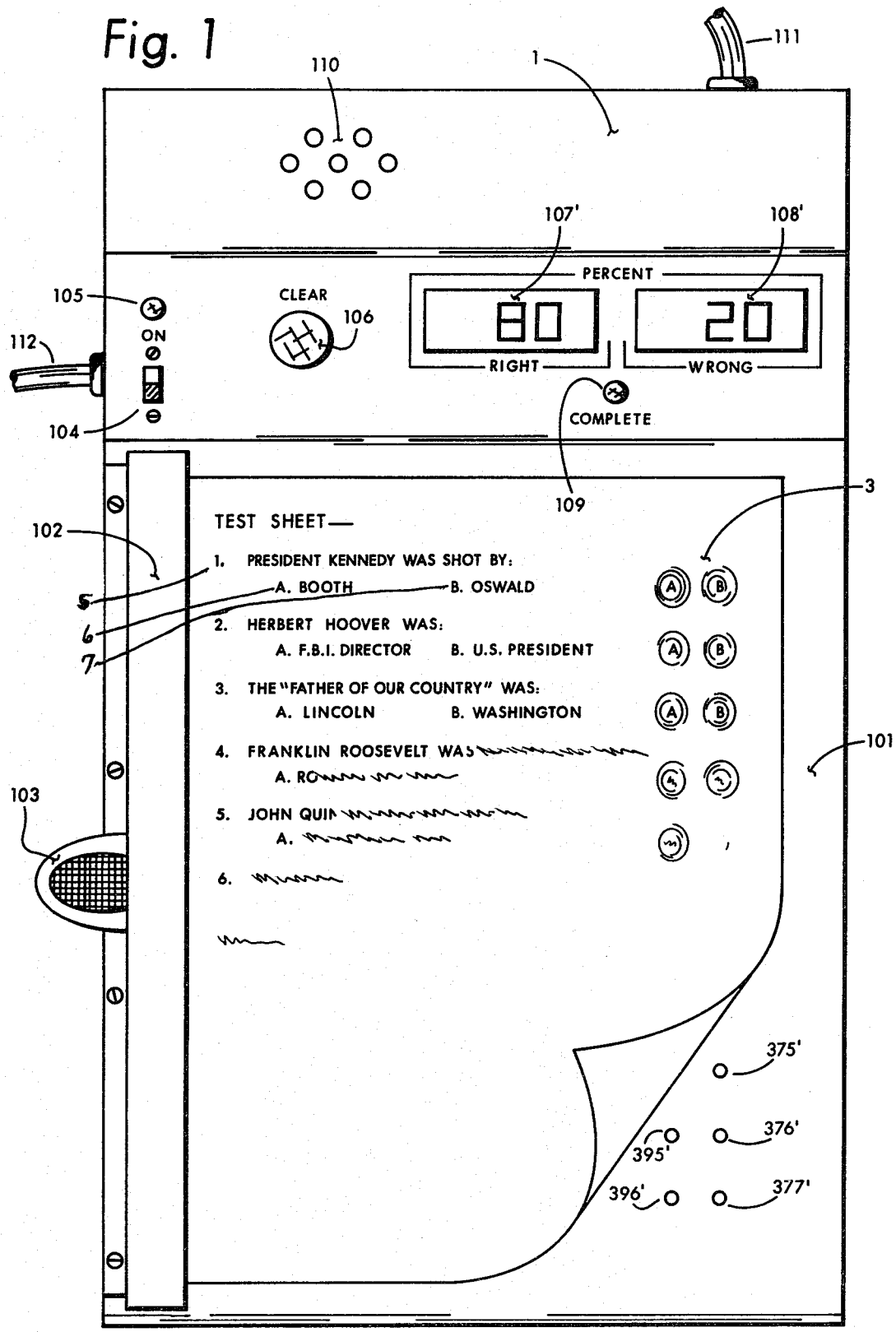

An illustrative view is shown in FIG. 1 for one embodiment of my instant invention as the student-operator sees the machine apparatus. The machine 1 consists of a second apparatus support conformation means including a receiving platform 101 upon which the first apparatus interrogatory document, or test paper sheet, 3 is placed by the operator. The said sheet 3 is prepared to include a first instruction means and a second instruction means, wherein said first instruction means consists of at least one interrogative statement, or question, 5 together with at least two alternative responses, or replication answers, 6 and 7 of differing exactitude and wherein further said second instruction consists of an indicia pattern comprised of several binary ciphers 4 (see FIG. 2) indicative of the correct selection for the said alternative response 6, 7 to the said interrogative statement 5. When the said first apparatus document 3 is placed upon the said second receiving platform 101 by the operator, the said first instruction means will remain visible to the operator whereas the second instruction said indicia means will engage with, and become substantially obscured from view by, a receptor means integral with the said platform 101 for the purpose of producing a denotive first signal pattern and thereby establishing a correct response means pattern within the said machine 1 didactic instrumentality. The said engagement is accomplished when the said first apparatus sheet 3 is clamped under bar, or holding means, 102 which is opened during sheet placement, either insertion or removal, by pressing down upon thumb lever 103. The said receiving platform 101 is provided with an ordered arrangement of a predetermined plurality of coupling devices or keyed light sources (typified by 375', 376', etc.) positioned so as to shine upon the back, or reverse side, of said first apparatus interrogatory document 3 and, due to the source brightness together with the relative thinness, or translucent material characteristic, of the said document 3, cause the said light sources to transilluminate, or pass through, the said test sheet 3 immediately under, or behind, each of the said alternative responses associated with each said first instruction, and thereby be visible to the operator. Also located within the clamp bar 102 is a switch means for recognizing the said second instruction indicia means coded pattern, consisting of several binary ciphers, contained in the cooperative area near the edge of the document 3 thereby serving to set-up the machine for correct alternative response, or answer, pattern as corresponding with the said first response question or other matter printed or otherwise applied to the test paper 3. As for example, for the first three first instruction questions, illustratively shown on test sheet 3, the machine is set up by the second instruction (not shown) to be responses 1-B, 2-B, 3-B. Therefore if the operator selects "B" in any or all of the said example questions, the machine will score him RIGHT for each replication so selected. Conversely, selecting an "A" response for any one of the three questions will result in the machine scoring the student a WRONG answer. When the student selects what he believes to be the correct answer 6 or 7, he proceeds to place the reponsive end of a third apparatus portable coupling means consisting of a handheld photosensitive pickup probe 2 (see FIG. 18) over the chosen answer response thereby producing a third signal which will cause the machine to function so as to score the correctness of his choice.

The machine 1 also includes a power switch 104 together with power-on indicant 105. A CLEAR switch button, or like arrangement, 106 is provided to initiate, or set up, the machine.

Scoring is displayed on the RIGHT 107' and WRONG 108' numerical readouts. When all the questions in the group have been answered, a COMPLETE light 109 is illuminated. In addition, as scoring progresses, a short audio tone burst, or "beep", emits from a sounder, or speaker, behind grille 110 for each selected answer, preferably being a beep of higher pitch for a correct answer and a beep of lower pitch for an incorrect answer. Power is provided via cable 111, while cable 112 connects to the respondent light stalk 2.

Figure 2:
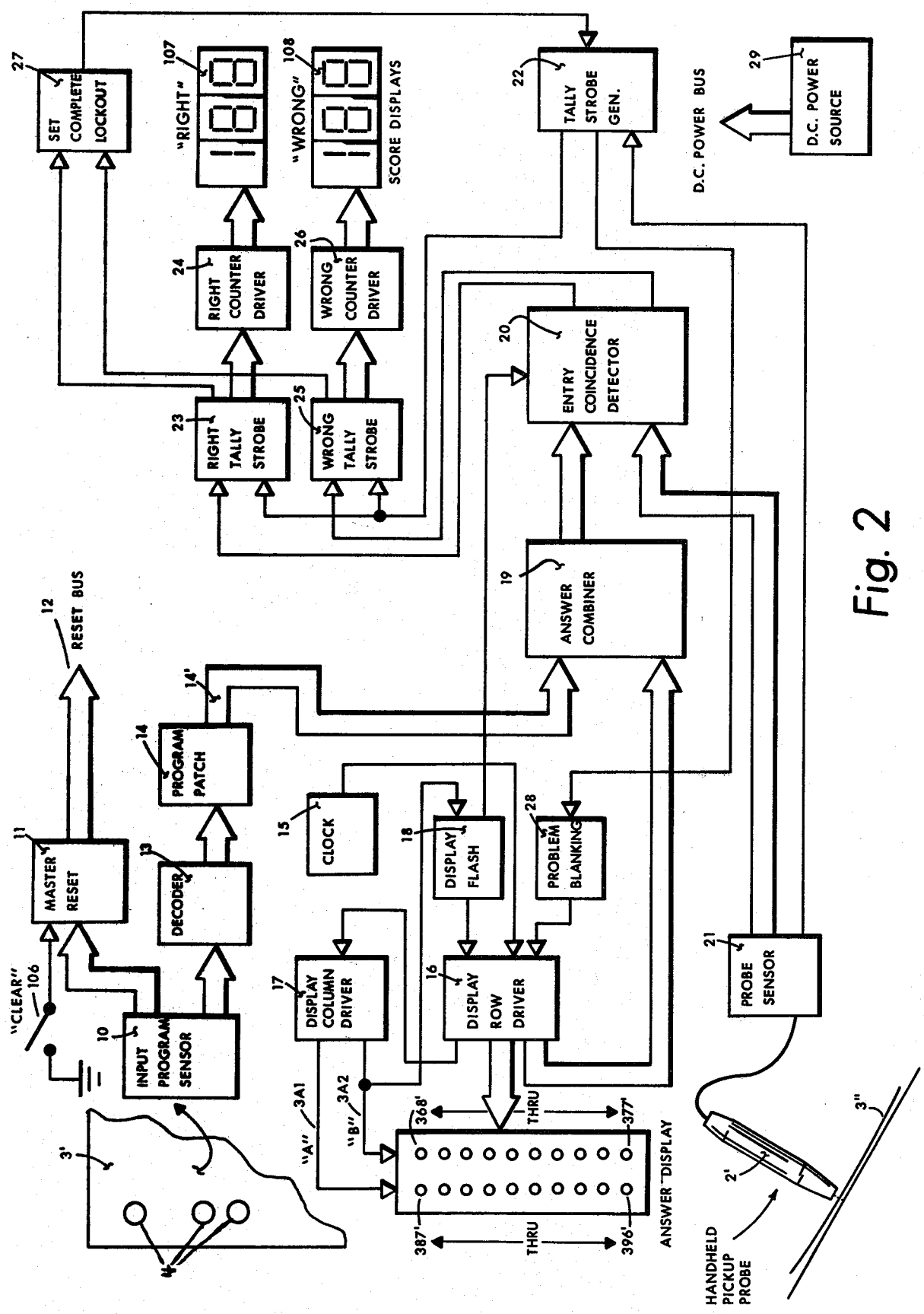

The block diagram for a preferred embodiment of my instant invention is shown in FIG. 2. Two input means are shown, the first being the first signal generative means consisting of the binary input program sensor 10 which responds to a unique coded indicia pattern on the first apparatus test sheet 3' as received under the said clamp bar 102. The second input source is the third apparatus third signal generative means consisting principally of a handheld pickup probe, or light stalk 2' serving as a portable coupling means which may be selectively positioned by the operator so as to be reading light passing through the translucent document 3'' from the answer display 9' which is located behind the answer sheet 3'' and so positioned as to cause transmissive devices, or light sources, 368' through 377', 387' through 396', which have been caused to be keyed by a timely coded second signal generative means, to shine through correspondent positions in the first apparatus test paper sheet.

The said input program sensor 10 recognizes a unique binary pattern which, when inputted to the master reset 11, together with a CLEAR switch 106 signal, will cause a reset signal to appear on the RESET BUS 12 which is connected so as to reset all counters, latches, and other machine operations. The other input program sensor 10 first signal output line drives a first signal decoder 13 and a first signal program patch 14, the purpose for which is to establish the "correct answer" program as read from the binary input program sensor 10. The decoded first signal drive lines 14' are routed to an answer combiner 19.

The answer display 9 second signal coupling devices, or keyed lights, preferably consisting of pulsed light emitting devices, say light emitting diodes, are driven in a unique timely coded pattern derived from a clock 15 which serves to drive a display row driver 16 and a display column driver 17 so as to produce a second signal format which will serve to sequentially "x-y scan" the second apparatus transmissive devices, or light emitting diodes. A display flash driver 18 is also included to increase the average ON time for each answer display 9 light and thereby cause the apparent brightness to appear higher and easier to see. A patterned output from the row driver 16 also provides drive, via line 16', to the answer combiner 19, which forms part of the fourth apparatus comparision means. The answer combiner 19 serves to organize the several inputs 14' and 16' into a unique combination which can be routed to the entry coincidence detector 20, which forms another part of the fourth apparatus, for comparison with the student selected answer inputs received from the third apparatus probe sensor 21. When an answer is correct, the said entry coincidence detector 20 will route a fourth signal to the right tally strobe 23 which, when coincident with a strobe signal from the tally strobe generator 22, will cause the right counter driver 24 and the RIGHT display 107 to increment. On the contrary, if the answer is wrong, the said detector 20 will route a fourth signal to the wrong tally strobe 25 which, when coincident with a strobe signal from the said tally strobe generator 22 will cause the wrong counter driver 26 and the WRONG display 108 to increment. The set complete lockout 27 increments for either a right or wrong tally and, thereby, determines the length of play. A direct current power source 29 supplies, via the direct current power bus, operating voltage and current to all the power requiring operative stages of the said machine.

Figure 3:
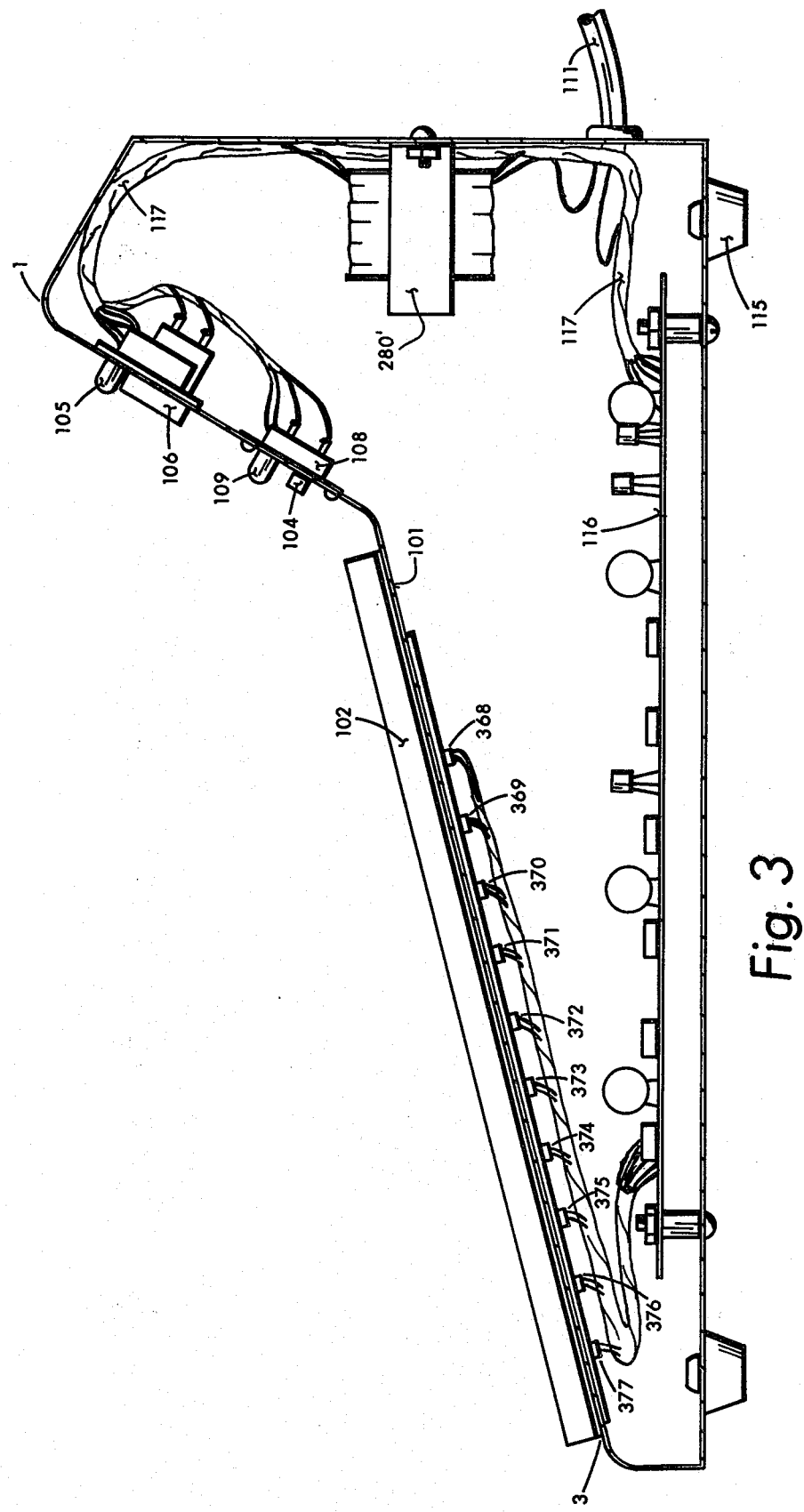

FIG. 3 is a skeletal side view of the machine 1 described for FIG. 1, showing the arrangement of key interior parts. Clamp 102 is shown sandwiching the first apparatus test paper 3 to the platform 101. The circuit board 116, cables 117, and power transformer 280' are shown, together with answer display lamps typified by 368, etc. The machine is supported on the work surface by feet 115, while power is brought in through cord 111.

FIG. 4 shows how a downward push on lever 103' deflects bar 102' so as to receive sheet 301'. The deflection is contained by flat spring 120 mounted on platform surface 101'.

FIG. 5 whows some variation on FIG. 4, in that a spacer 121 is included so as to permit a rubber strip 122, or the like, to be fixed along the front edge of the clamp 102'.

FIG. 6 is a cutaway endwise view of the clamp bar 102", showing the position of the light emitting diodes 130' (typical), as contained by encapsulating compound 123, arranged so as to shine, or project, on the photoreceptor 135' (typical) which is affixed in the mounting platform 101" and further arranged to project through aperatures in the test sheet 301".

FIG. 7A is yet another sidewise cutaway view further showing the arrangement of light emitting diodes 130', 131' in bar 102, coincident with photoreceptors 135', 136' and also 137', 138', 139' in relation to answer sheet 301'.

The student's test, or answer, sheet 301 is shown in FIG. 7B illustrating the position of aperatures 302, 302', 302" so as to generate a five bit code (when an opening, or aperature, signifies binary (0)) as (01001) for purpose of example.

Figure 8:
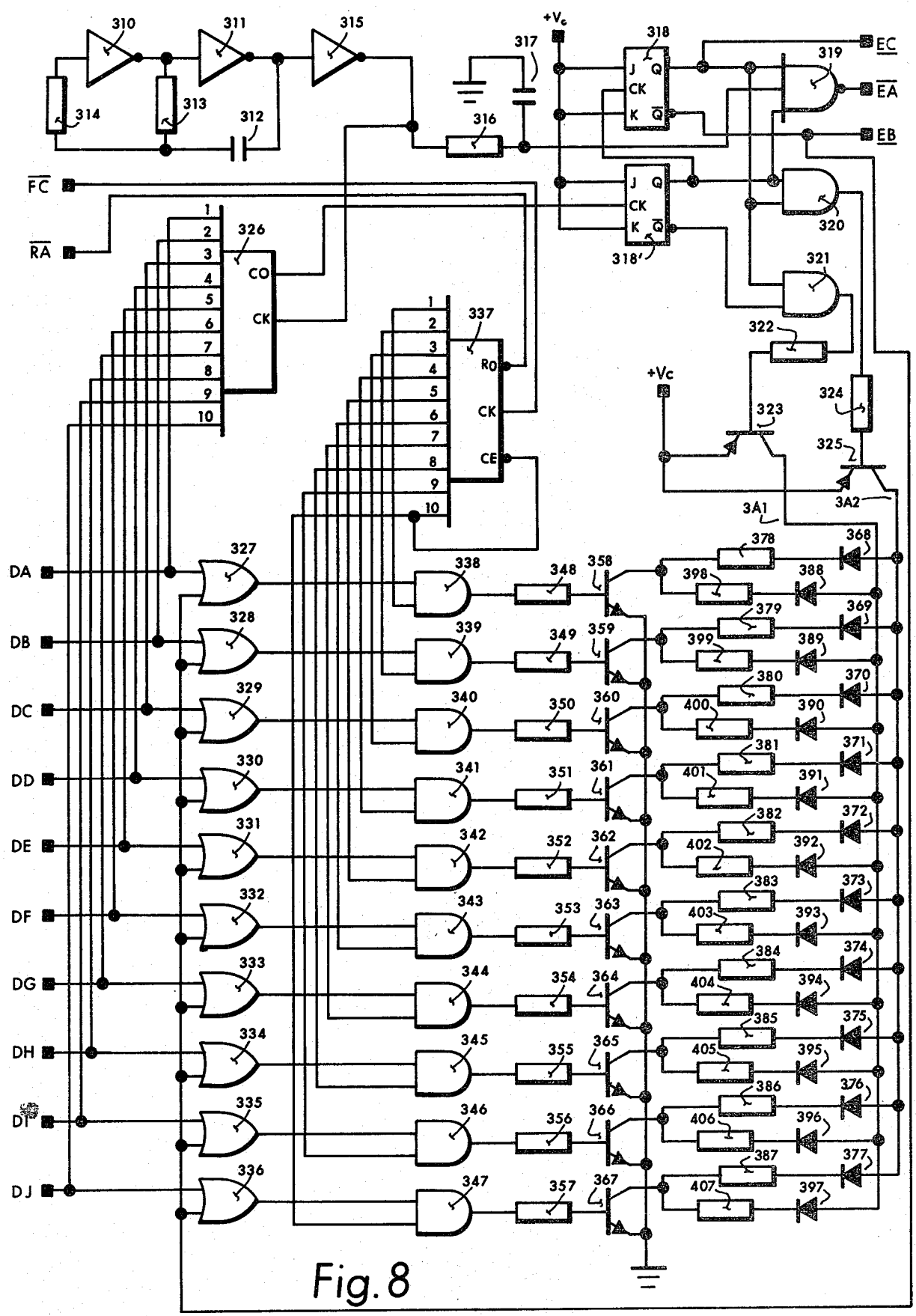

FIG. 8 shows the answer display driving means. A clock oscillator consisting of inverters 310, 311 together with resistors 313, 314 and capacitor 312 forms an astable multivibrator running 2,200 hertz, more or less. An inverter 315 drives row counter 326 which, in a timely coded sequential manner, drives the various rows of coupling devices, or light emitting diodes 368 through 376, 387 through 396 by means of respective OR-gates 327 through 336, AND-gates 338 through 347, base resistors 348 through 357, drive transistors 358 through 367, and ballast resistors 377 through 386, 397 through 406. Flip-flops 318, 318' form a divide-by-four counter clocked from the carry output on counter 326. Operation is such that the clock causes counter 326 to scan one through ten on the transmissive device lamp diodes, whereupon a pulse will be delivered from the counter 326 carry output to the divide-by-four counter 318, 318' causing the said counter to advance by one count. The ROW drive is obtained from flip-flop 318' output with the "0" count (Q=0) driving the FALSE column, whilst the "1" count ($\bar{Q}$=0) drives the TRUE column. The next, or "2", count advances flip-flop 318 causing the said flip-flop 318 "Q" output to go logic "0", causing both column drivers 323, 325 to be turned ON through base resistors 322, 324. At the same time the said flip-flop 318 "$\bar{Q}$" output goes logic "1" pulling the combined inputs of said OR-gates 327 through 336 to logic "1" resulting in a turn ON signal to the AND-gates 338 through 347 for all answer display second signal coupling device light emitting diodes.

This condition is maintained through the "3" count, thereby resulting in a steady-state "lamp-on" condition throughout the count "2" and count "3" periods. The result is, and this is a key part of my new invention, a longer than usual, or in this example an over fifty-percent duty cycle for the lamps, causing the effect of greatly increased apparent light output, or brightness. Counter 337, together with AND-gates 338 through 347, enables only one ROW at a time in a sequential manner, meaning the associated light emitting diodes are illuminated for one problem at a time guiding the student through the test, advancing one position for each question answered.

Figure 9:
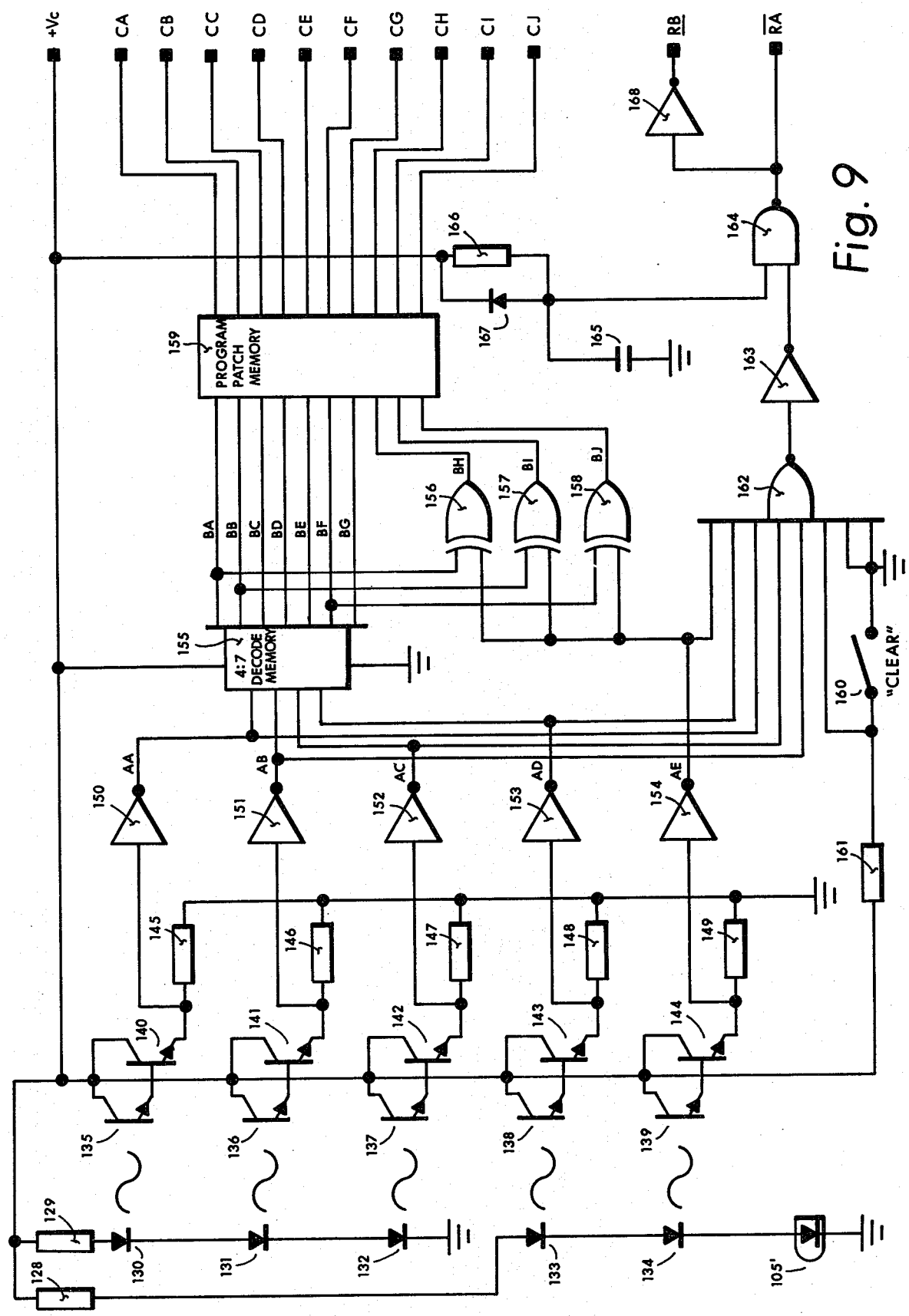

FIG. 9 shows the circuit arrangement for the said input program sensor receptor means 10. Five light emitting diodes 130 through 134 are mounted on the second apparatus test platform so as to illuminate photoconductive devices, viz phototransistors 135 through 139 through aperatures serving as an indicia representing the said second instruction on the associated test paper wherein the presence or absence of the said aperatures, either collectively or individually, forms a cipher pattern which is indicative of a binary code condition. The power-on lamp 105' balances the two light emitting diode circuits fed from ballast resistors 128, 129. The sense, or said in another way as polarity, of this circuit is such that light on the phototransistor results as a logic "0" at the outputs of isolation inverters 150 through 154. The said inverter inputs are driven by darlington connected transistors 140 through 144, together with emitter resistors 145 through 149. The resulting outputs AA, AB, AC, AD serve to drive a 4:7, or four bit to seven segment, decoder 155 whereas the AE output drives the parallel inputs of EXCLUSIVE-OR-gates 156, 157, 158. The outputs of decoder 155 results in outputs BA, BB, BC, BD, BE, BF, BG. Three outputs, illustratively BA, BB, BF route also to the respective inputs of said gates 156, 157, 158 resulting in subsequent outputs BH, BI, BJ. The various lines BA through BJ connect to program patch 159 wherein they may be alterably, and uniquely, cross connected to subsequent output lines CA through CJ.

The collective purpose of the 4:7 decoder 155, and the gates 156, 157, 158 is to establish a means for producing any one of thirtytwo plural combinations of outputs BA through BJ for some plural combination of the 5-bit input code AA through AE. The use of a 4:7 segment display decoder is inexpensive as a solution, together with preset program patch memory 159 which can serve to "mix-up" the BA through BJ lines as they serve to drive the CA through CJ output lines. On the other hand, the said decoder 155, said gates 156, 157, 158 and program patch memory 159 might, just as effectively, be replaced by a single preprogrammed read-only memory (ROM) with a 5-bit, AA through AE, input and a ten-line CA through CJ output. In any event, with the 5-bit input AA through AE, the student is afforded thirty-one different answer combinations which may be determined by means of the indicia included on his test paper by the preparer, thereby minimizing the possibility for memory retention, either intentional or latent, of the answer sequence.

The lines AA, AB, AC, AD, AE also connect to NOR-gate 162. The result is that, when all the said AA through AE lines are logic "0", as when the test paper 3 is withdrawn from the machine, closing the CLEAR switch 160 will result in a logic 1 on the output of said NOR-gate 162 which is processed by inverter 163 and NAND-gate 164 into reset pulse $\overline{RA}$, and, through inverter 168, into reset pulse $\underline{RB}$ to serve to initialize the various counters and flip-flops utilized in the machine. In addition, said NAND-gate 164 together with capacitor 165 and resistors 166 form a "power-up reset" circuit, thereby causing a reset pulse to occur for the period it takes for resistor 166 to charge capacitor 165. A 20 to 50 millisecond time constant serves this function well. The steering diode 167 serves to rapidly discharge capacitor 165 on power-down.

FIG. 10 gives the modeled form for my fourth apparatus consisting of said answer combiner 19 and said entry coincidence detector 20 functions. Plural NAND-gate functions 169 through 178 serve to combine the answer program lines CA through CJ with sequential row-scan bus lines DA through DJ. What occurs is that the program lines CA through CJ will have a unique binary combination, as for example, with the input code (01001) shown in FIG. 7b, and with the program patch setup for output lines CA through CJ to be equal to lines BA through BJ respectively (Ref: FIG. 21-a), the resultant combination will be (1101101001) for lines CA through CJ respectively. The row scan lines DA through DJ will, on the other hand, all be logic "0" except when the sequential row drive pulse derived from said counter 326 is present. The outputs of the said NAND-gates 169 through 178 will, accordingly, change state or switch, with the output lines HA through HJ driven "0" only when both input lines to each respective gate 169 through 178 are high, or logic "1". In the cited example such action can occur only for lines HA, HB, HD, HE, HG, HJ whereas lines HC, HF, HH, HI will remain logic "1" and can not switch due to the states established on lines CC, CF, CH, CI by the cipher indicia 302 on the test paper 3.

Plural input NAND-gate 179, together with NAND-gate 180 and NOR-gate 181 form the equivalent of, in this example, a ten line negative-OR function, that is to say a logic "0" on any line HA through HJ will produce a logic "0" on line JC, whereas when all lines HA through HJ are logic "1", output line JC will be logic "1".

A column drive coincidence signal $\overline{EA}$ is applied to the input of NOR-gate 182 along with line JC and, when both $\overline{EA}$ is logic "0" and JC pulses logic "0", a logic "1" will occur at said NOR-gate 182 output, as applied to one input of NAND-gate 183. Said gate 183 also inputs a column drive signal EC, so as to lockout the gate 183 during the alternate cycle of flip-flop 318 whilst the remaining input is received from a probe gate pulse GA. The output of said gate 183 produces a fourth signal which serves to drive RIGHT tally strobe NOR-gate 186 directly, and WRONG tally strobe NOR-gate 185 through an inverter 184. A CHECK ANSWER signal logic "0" on the $\overline{FE}$ line, together with a not-COMPLETE logic "0" on line $\overline{FD}$ serve to enable flip-flops 189, 190 in conjunction with NAND-gate 187 to produce an $\overline{FC}$ strobe pulse the period of which equals the period of, and is synchronized with, one $\overline{GA}$ probe pulse. The said strobe pulse so produced serves to drive inputs on NOR-gates 185, 186 and, when the output from NAND-gate 183 is logic "1", the WRONG strobe line $\overline{FB}$ will produce a logic "1" pulse equal in period to the $\overline{FC}$ pulse. Conversely when the output of NAND-gate 183 is "0", the RIGHT strobe line $\overline{FA}$ will produce a logic "1" pulse equal in period to the $\overline{FC}$ pulse.

FIG. 11 shows the gated audio tone burst, or beep, generator means. When a RIGHT answer is indicated by a logic "1" pulse on the $\overline{FA}$ line, inverter 250 output will produce a logic "0" which will serve to discharge capacitor 252, which has previously been charged to a logic "1" by resistor 253, through discharge diode 251. The result is that the corresponding input of NOR-gate 254 is driven logic "0" for the time it takes resistor 253 to recharge capacitor 252 to a logic "1" level, say 100 milliseconds, more or less. The resultant logic "0" on the input of NOR-gate 254 will enable the said gate, together with inverter 255, capacitor 256, and resistor 257 to function as an astable multivibrator producing a brief sensory audio tone of first pitch, say 700 hertz. In the event of a WRONG logic "1" pulse on the $\overline{FB}$ line, inverter 258 will, in a like way, discharge capacitor 260 through diode 259, thereby enabling the astable multivibrator consisting of NOR-gate 262, inverter 263, capacitor 264, and resistor 265 to produce a sensory audio tone of second pitch, say 300 hertz, for the time period, say 150 milliseconds, it takes resistor 261 to recharge capacitor 260 to a logic "1", thereby once again inhibiting gate 262 and halting said second pitch oscillations. The outputs from the two oscillators, either of which may operate, are combined in AND-gate 266 so as to serve to drive transistor 268 through base resistor 267 to produce an audio tone in speaker 270 through volume limiting resistance 269. Said resistance 269 may, of course, be made variable and thereby serve as a volume control.

Figure 12:
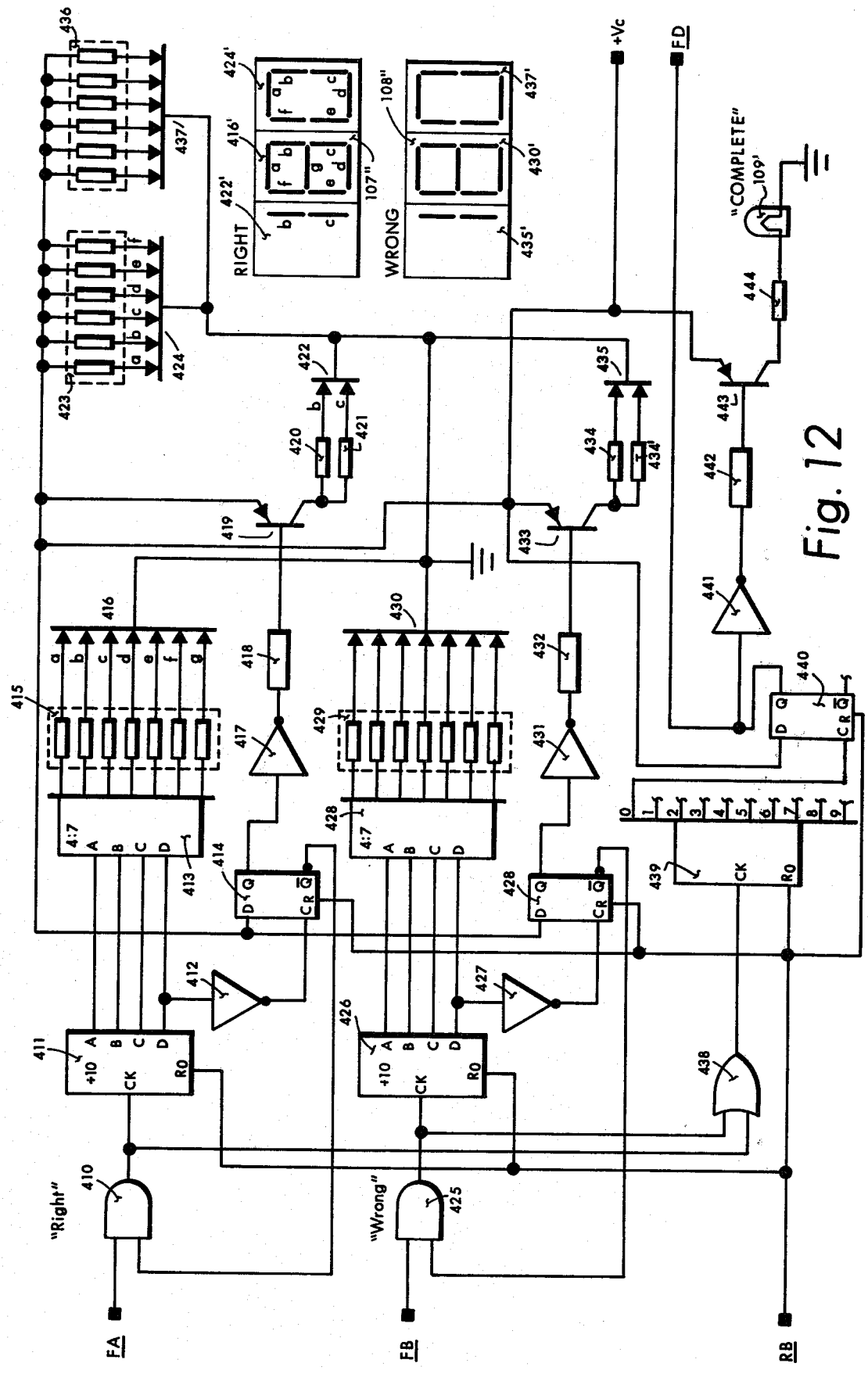

FIG. 12 is the tally display, or scoring circuit, employed in my described embodiment. When a RIGHT strobe signal $\overline{FA}$ occurs, and all stages have been previously reset or initialized, a corresponding logic "1" pulse will appear as a CLOCK input pulse to binary coded decimal, or BCD, counter 411, thereby advancing the count by one. The counter output is coupled directly to a BCD to 7-segment display driver 413 wherefrom drive for the appropriate "a" through "g" segments of the 7-segment light emitting diode display 416 is derived through ballast resistors 415. As shown, digit 416 is the second digit from the right, or middle digit 416' in the said RIGHT score display group 107'. The least significant bit (LSB) 424' is maintained in a constant zero state by drive resistors 423 exciting all but the "g" segment of display 424.

When decade counter 411 has advanced nine steps, the next, or tenth step will cause the counter 411 "D" line transistion to, through inverter 412, produce a positive trigger to the CLOCK input of flip-flop 414, thereby causing the $\overline{Q}$ output to go logic "0", jamming the input AND-gate 410 from accepting any further $\overline{FA}$ pulses. Concurrently, the Q output on flipflop 414 will be driven logic "1", thereby producing a logic "0" on inverter 417 output which will, be meansof base resistor 418, turn-on or saturate PNP transistor 419 thereby producing current through resistors 420, 421, into the "b" and "c" segments of left-hand display 422 with the result that a figure one will be produced and further, since digits 416 and 424 produce a zero under this condition, the composite display result 107" will be the number onehundred.

In a like way, a WRONG strobe signal $\overline{FB}$ will increment decade counter 426 thereby causing the corresponding display 430 to advance one digit display as driven by BCD decoder 428 through ballast resistors 429. A ten-count on BCD counter 426 will serve to clock flipflop 428 through inverter 427, thereby causing the display of a figure one on device 435 "b" and "c" segments as driven by inverter 431, base resistor 432, transistor 433, and ballast resistor 434, 434' from the "Q" output of flipflop 428. Display 437 is also driven to display a zero by driving all segments except "g" through ballast resistors 436. The relationship of WRONG displays 435', 430', 437' is shown, and as in the caseof the RIGHT display, can in this configuration produce any decimal number between ten and ninty, plus the number one-hundred, thereby yielding, when working with a ten-question input, a direct percentile readout.

An OR-gate 438 receives logic "1" clock pulses as presented to either counter 411 or 426 and produces at the output thereof a positive pulse which is connected to the CLOCK input of decade counter 439. This counter includes a direct 10-line, decimal decoding, say a CD4017, integrated circuit wherein the output line "φ" through "9" which is selected goes high, or logic "1" upon selection. The purpose for the said counter 439 is to keep track of how many questions have been answered, be it right or wrong, so as to establish the duration of the test, viz limit the test in this example to ten entries. This is to say that the counter advances once no matter if the student's selection is RIGHT or WRONG. When the tenth question is answered, the counter will recycle to zero whereby the positive line selection signal leading edge on counter 439 line "$\phi$" will CLOCK the flipflop 440 so as to produce a logic "1" at the "Q" output which provides the COMPLETE jam signal $\overline{FD}$ and produces a logic "0" on the output of inverter 441 thereby turning on PNP transistor 443 through base resistor 442 with the result that the "COMPLETE" indicant 109' will be activated through ballast resistor 444 to show the student that the test is complete.

FIG. 13 gives illustration of the circuit for the modeled form for the third apparatus portable coupling means, or handheld probe 2 including the probe sensor means 21. A photosensitive device, viz phototransistor 210, views the diffuse light 209 passing throug the first apparatus test sheet medium 3" from typical second signal timely gated light source 368. It is noteworthy to point out that the light emitting diode, or like transmissive device, selected for typical source 368 should produce both visible light, and energy to which the photosensor, or like device, is responsive. This is well fulfilled through the use of a diffused gallium arsenide phosphide diode, commonly called a "red LED" and typified by the Monsanto MV54 type. Such a device produces a bright visible red output with the peak energy wavelength occurring around 6,600 angstroms. The said phototransistor, typified by a Monsanto MT2 type, exhibits a peak sensitivity around 8,200 angstroms, but for this application retains about 70% of the peak sensitivity at 6,600 angstroms thereby making an excellent overall match.

A separate transistor 212 is interconnected with said phototransistor 210 to form a darlington pair connection. Further improvement in stray, say ambient, light can be found through using a wavelength selective, or optical, filter in conjunction with optical coupling device, say lens, 211. Such a narrow band filter centered about 6,600 angstroms does show improved interference immunity.

The light signal amplified by transistor 210, 212 serves to pull base current through transistor 215 by means of base resistor 214, as well as collector resistor 213. Two important adjustments are shown which serve to affect transistor 215 operation. An emitter resistor 216 in the form of a potentiometer provides massive degeneration, in particular at low frequency and for direct current. The capacitor 217 on the other hand serves to bypass potentiometer 216 degenerative resistance as the arm is advanced towards the emitter of transistor 215, thereby increasing the higher frequency A.C., or pulse response gain for the stage. A second potentiometer 221, connected as a rheostat, appears in the collector circuit for transistor 215 together with collector load resistor 220. As the arm of potentiometer 221 approaches ground, the gain, in particular at D.C. and low frequencies, will diminish. Thus the two adjustments interactively permit ready adjustment for a variety of device sensitivities and ambient light operating conditions so as to make for most satisfactory performance.

The collector signal appearing across resistors 220, 221 together with a column drive gate signal $\overline{EC}$ together with the "CHECK" switch 218 closure signal as inverted by 234. Resistors 231, 232 and capacitor 233 form a switch 218 debounce circuit. A second inverter 235 provides a $\overline{FE}$ output. A triggered oneshot consisting of NAND-gate 226, inverter 227, capacitor 228, and resistor 229 provides a pulse conditioning means, triggered by the output of said gate 222 as differentiated by capacitor 223, and resistor 224, together with recovery diode 225. The monostable output drives inverter 230 to provide the probe output signal $\underline{GA}$.

FIG. 14 shows one embodiment for a power supply means suited for my herein described apparatus. A transformer 280 receives utility power through plug means 275, switch 104', and protective device 276. The transformer secondary is rectified by diodes 281, 282 so as to produce across capacitor 283 a direct current voltage which is regulated, say 8 volts, by unit regulator 284 and provided at terminal 286 which is bypassed by capacitor 285 so as to produce a stable voltage which is interconnectively distributed to all the active devices in the machine.

FIG. 16 is an open view of the third apparatus pen-like handheld probe 2. The diffuse, gated light 209 enters photoreceptor 202 (i.e., 210), said transistor 202 being mounted on a circuit carrying substrate which supports other elements including transistor 212', switch 203 (i.e., 218), capacitor 217', potentiometer 221, transistor 215', and interconnect cord 112.

FIG. 17 is an enlarged view of the nose end, or receptor end, of the third apparatus probe 2', shown in relation to the light emitting diode typified by 387. In this view what is in particular shown is how the light 208, emanating from the second signal coupling device light source 387 serves to transilluminate 209 the first apparatus test paper 301, with the so diffused light 209 passing onto the receptive end of the third apparatus photosensor 202'. The light emitting diode 387 is shown mounted on an insulating substrate 114, so as to permit the light to project through an aperture in the face of the second apparatus machine 113.

FIG. 18 is a view showing the third apparatus pen-like pickup probe and how it is positioned in relationship to the surface of the second apparatus machine 113' and the first apparatus test paper 301. The position of the momentary contact "CHECK" switch button is also viewable. The second apparatus machine surface is also shown, in part, supporting lamps, or second signal transmissive devices, 387, 388, 389, 390, 391, 392. The sections XA" corresponds with like section XA in FIG. 16 and XA' in FIG. 17. Section XB, XB' corresponds with the enlarged section shown in FIG. 17.

Figure 19:
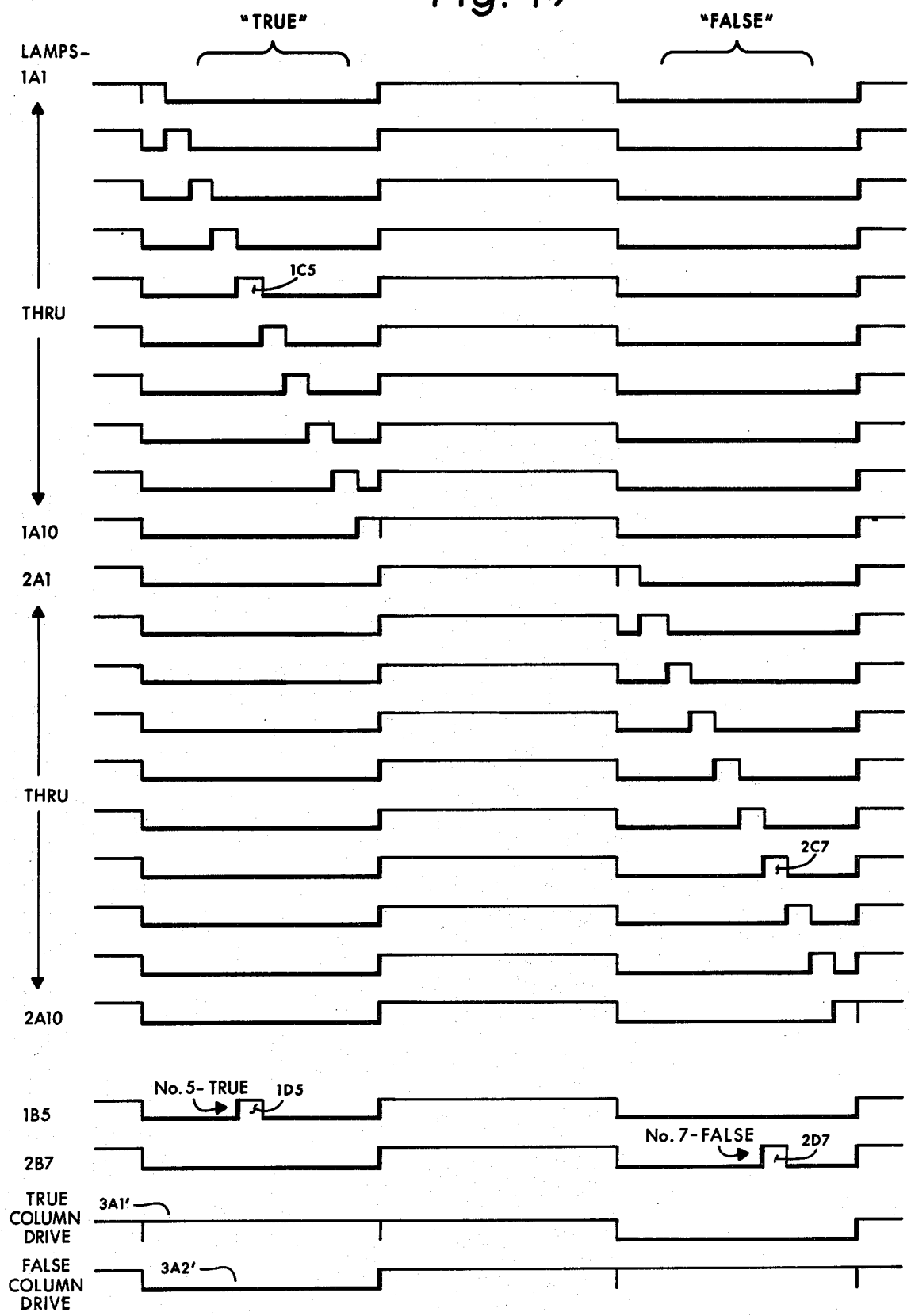

A timing diagram appears in FIG. 19 which shows some of the key sequences in the machine. The waveforms 1A1 through 1A10, 2A1 through 2A10 correspond with the timely coded drive signal applied to answer display lamps 368 through 377, 388 through 397, respectively. What is clearly shown is the step-like sequence the lamps go through for keyed gating, together with the extended "on" cycle provided for increasing the average brightness.

The 1B5 waveform is illustrative of the output of the third apparatus photosensor 210 (see FIG. 13) when positioned cooperatively over the fifth question row TRUE column light 372. The 1D5 pulse is that picked up from the second signal coupling device light emitting diode 372, shown to be a replica of drive pulse 1C5 on waveform 1A5. The 2B7 waveform is illustrative of the output of the said phototransistor 210 when positioned over the seventh question FALSE column light 394. The 2D7 pulse is that picked up from the light diode 394, shown to be a replica of drive pulse 2C7 on waveform 2A7. A like relationship can be expected on any other TRUE or FALSE column lights.

Waveforms 3A1' and 3A2' show the column drive waveforms typical of the collector waveforms on transistors 323 and 325 respectively in FIG. 8.

FIG. 20 is a partial block diagram of the audio "beep" circuits, said block diagram shown to interface with the main block diagram shown in FIG. 2. As shown, a signal from the RIGHT tally strobe 23, or WRONG tally strobe 25 triggers the respective RIGHT audio burst oscillator 30, or else the WRONG audio burst oscillator 31, causing a tone signal F1 or F2 to drive audio tone amplifier 32, and accordingly a sounder device 270.

FIG. 21-a, 21-b, 21-c show three of some 1024 program patch 159 combinations which may be accomplished. FIG. 21-a shows the patch 159-A with straight-through, BA through BJ equal CA through CJ respectively, connection arrangement. FIG. 21-b is more complex in that substantial criss-cross connection is shown causing a complex input to output transistion. FIG. 21-c is yet another transposition, wherein the input and output connections are two-offset, viz BC=CA, BD=CB, etc. The arrangement in FIG. 21-c has some advantage in that the connections are less of a problem should photographic circuit fabrication techniques, i.e., printed circuits, be employed.

FIG. 22, together with FIG. 23, is a departure from the read-through input program sensor means, wherein an aperature is employed to let, or else not let, light project through the document. This method, on the other hand locates the typical light device 130' and the typical photoreceptor 135' on the same side of the test paper and depends, therefore, for operation upon the reflectance of the paper surface, or alternatively the lack thereof when the area is shaded-in with ink of low reflectance, a process compatible with the printing of the interrogatory document. The diode 130' and the phototransistor 135' may take the form of a Monsanto MCA-7 type reflective object sensor. A condition of non-reflection is desirous as a logic "0" condition, to preclude blank paper edges from triggering the machine into reset, thus the arrangement of typical resistor 145' and typical inverter 150 are changed from the emitter to the collector side of the transistors 135', 140' to serve to reverse the polarity sense of the resultant light activated logic condition.

FIG. 23 is a section of the cooperative portion of the interrogatory, or test sheet 124 with the five described input sensor retroreflective regions filled in so as to not reflect and appear as all logic "0" conditions. In this example marks 125A, 125C, 125D correspond to aperatures 302, 302', 302" in FIG. 7B in-so-far as function is concerned.

Figure 24:
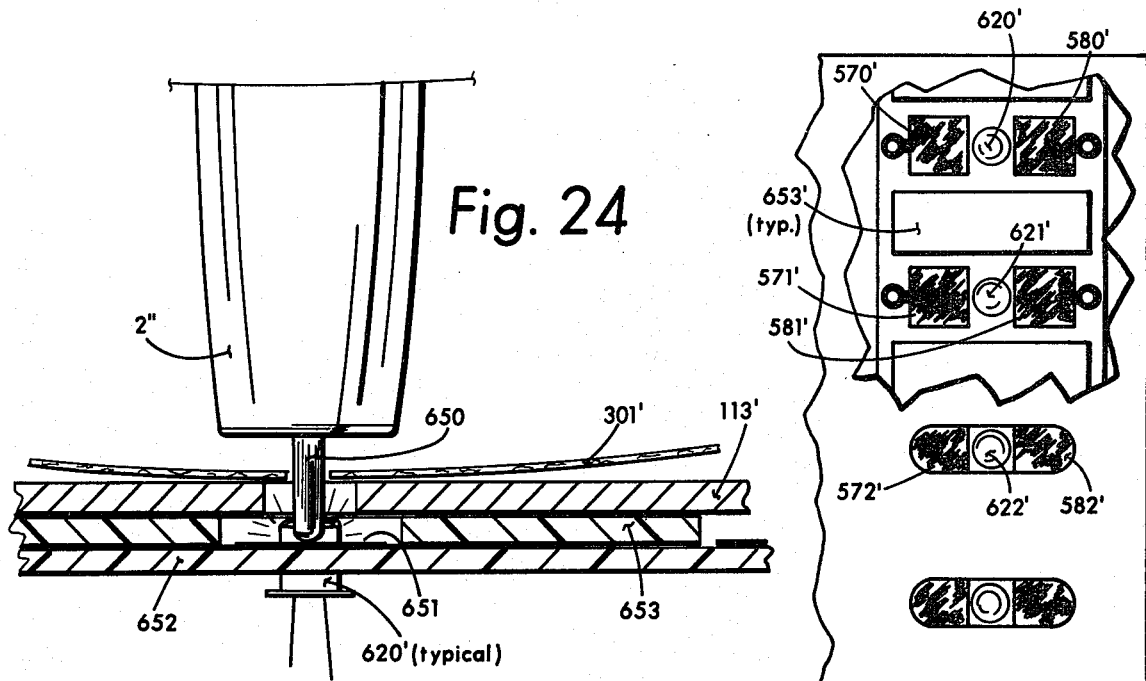

FIG. 24 shows a view of a third apparatus probe coupling means 2" wherein direct contact is made between the coupling means 650 and the second apparatus coupling device 651. The said coupling means 650 consists of an elongated means 650 which preferably is, at least, jacketed with a metal, such as silver, which exhibits high electrical conductivity. The said coupling device consists of a like conductive means in the form of a thin pad 651 supported on insulative substrate 652. The said substrate 652 is further caused to be separatte a small distance from the back side of the second apparatus receiving platform 113' by insulative spacer, or separator, 653. The probe 2" coupling means 650 makes contact to the coupling device 651 through an aperature in the test sheet 301' which is cooperative with a corresponding aperature in platform 113'.

Figure 25:
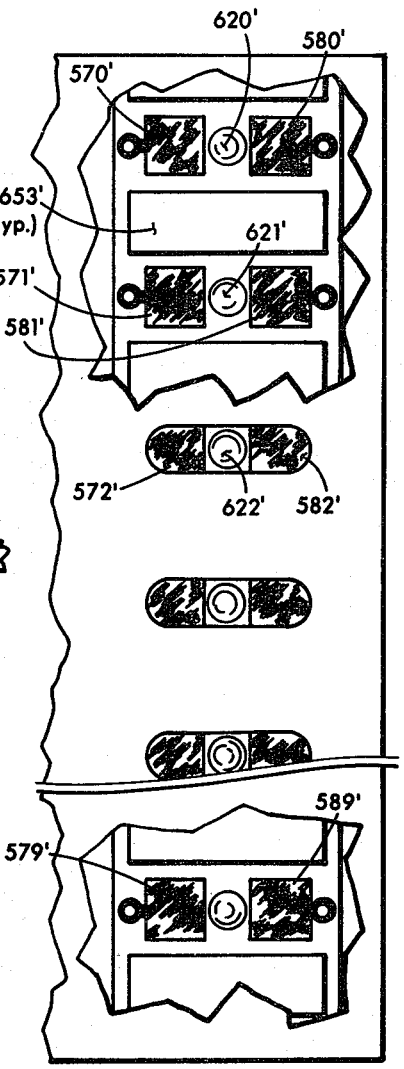

FIG. 25 is a top view of the work platform showing the direct contact coupling devices 570', 571', 572', etcetera, through 579', and 580', 581', 582, etcetera through 589'. Light emitting devices 620', 621', 622', etcetera are shown in position to transilluminate an overlaid document.

Figure 26:
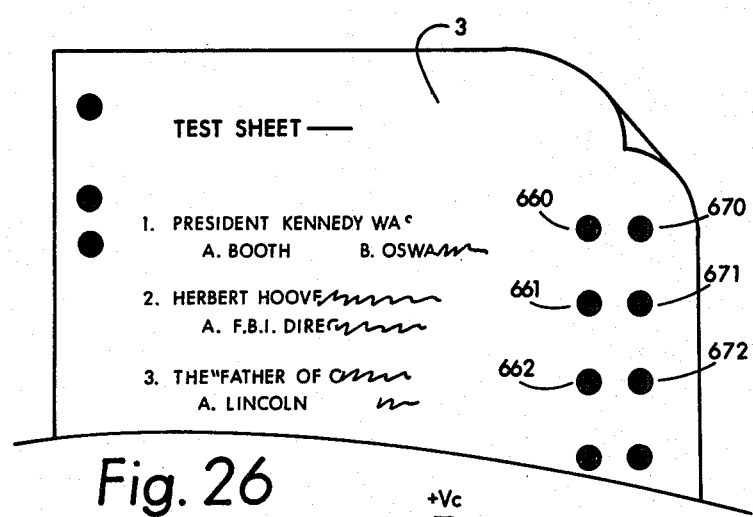

FIG. 26 shows the interrogatory document 3 including aperatures 660, 661, 662, etcetera, and 670, 671, 672, etcetera, corresponding with the replication choices.

Figure 27:
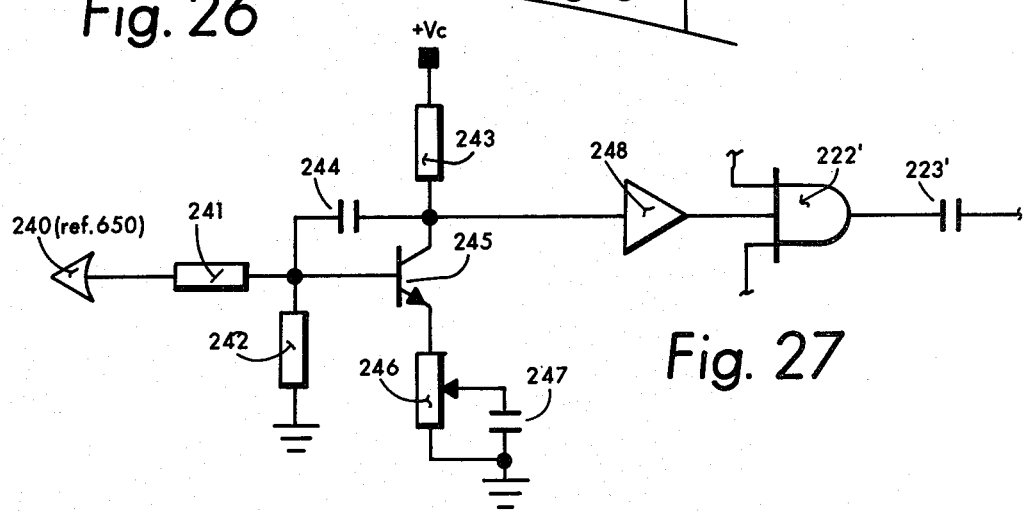

FIG. 27 schematically shows the preferred circuit for the probe 2" when using a direct, contactual coupling means. The probe tip 240 (ref. also 650) is arranged so that, should a positive signal be applied, transistor 245 will turn-on by way of base current introduced through resistor 241, in conjunction with 242. This will accordingly cause emitter and collector current to flow. Fast A.C., or else high frequency component, signals are bypassed in the emitter circuit by bypass capacitor 247 which is variably positioned across emitter resistor 246, such variation having the effect of adjusting the sensitivity of the said coupling means to the said coupling device signals. Collector current through resistor 243 will cause voltage variations at the input of inverter 248, which serves to drive one input of NAND-gate 222'. The remaining gate 222' connections, together with capacitor 223' connection, continue to form the remaining circuit as shown in FIG. 13.

Figure 28:
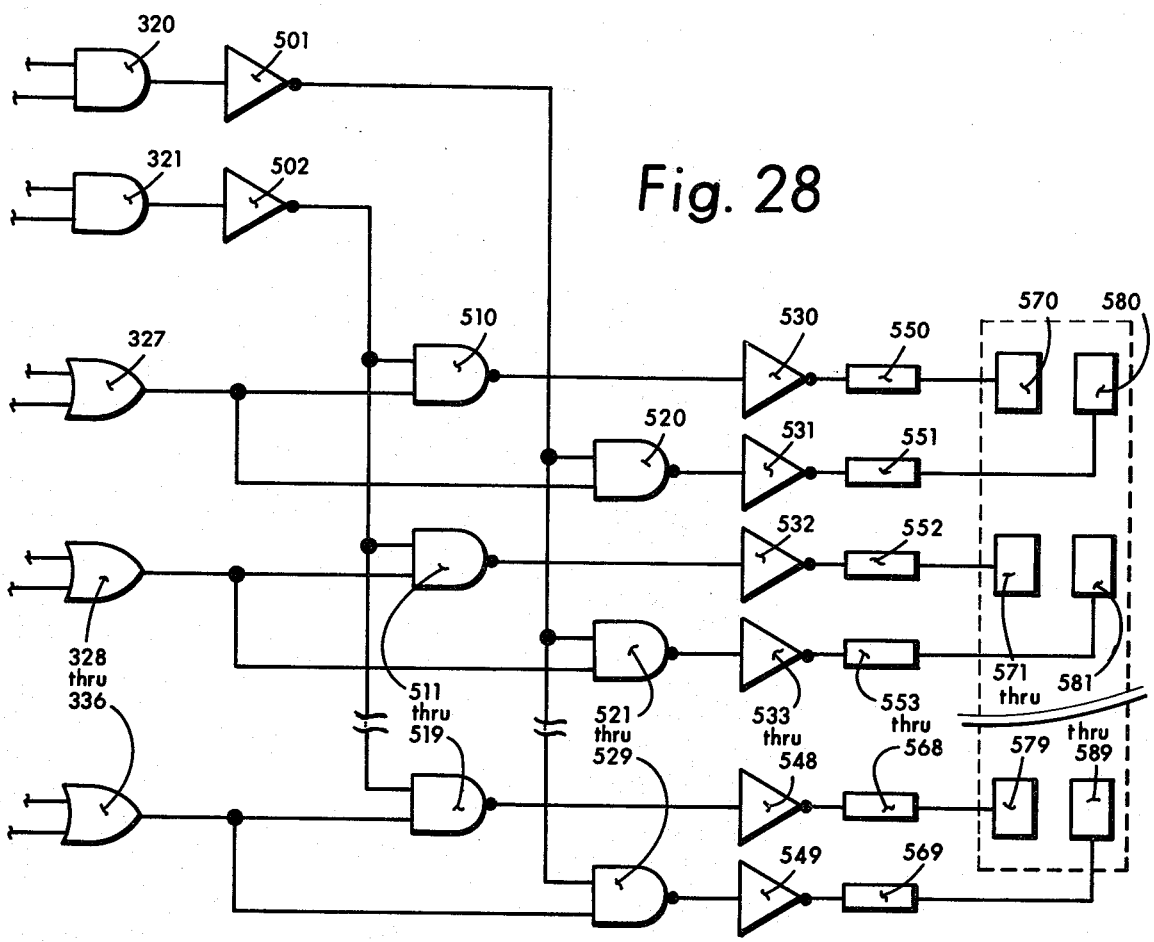
Figure 29:
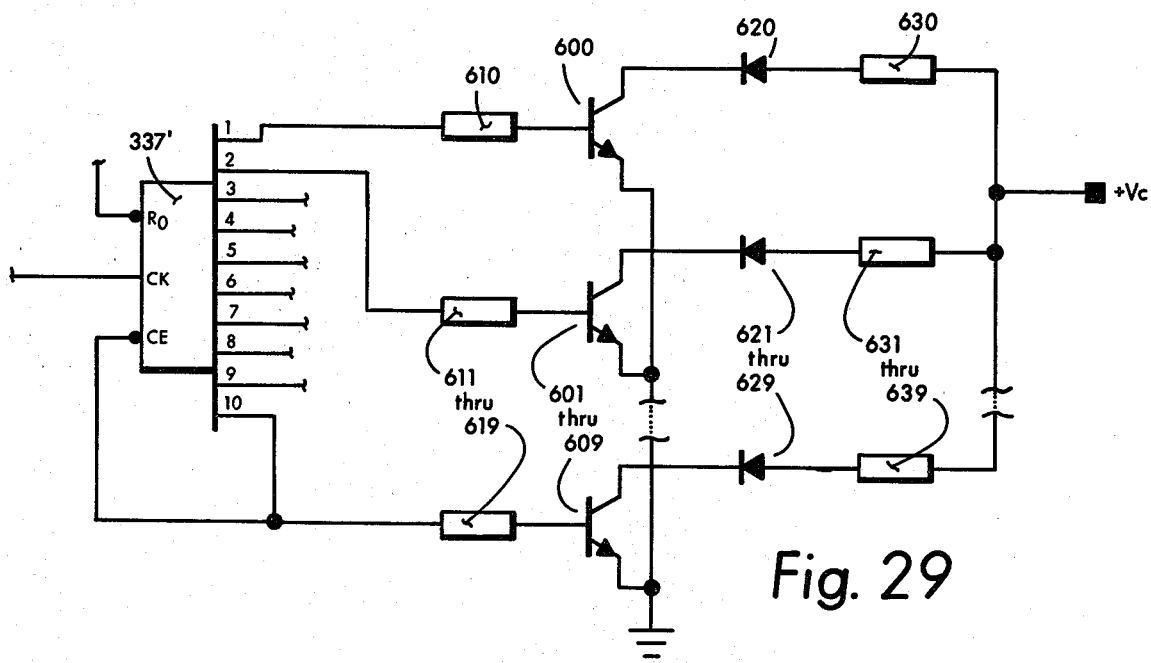

FIGS. 28 and 29 illustrate changes to the circuits shown in FIG. 8, to enable such circuit to operate with the contactual coupling means.

FIG. 28 shows the conductive coupling device 570 through 579, 580 through 589 signal drive means. Gates 320, 321, 327 through 336 perform as described fro FIG. 8, in so far as input connections are concerned. What transpires is that the pulsed logic "1" state on the gate 327 through 336 outputs serve to drive one respective input of NAND-gates 510 through 529. The remaining input of NAND-gate 510 through 519 are parallel driven by the inverted 502 output of said gate 321. In a like way the remaining inputs of NAND-gates 520 through 529 are parallel driver by the inverted 501 output of said gate 320. The individual outputs of said gates 510 through 529 serve to drive power inverter-buffers 530 through 549, which accordingly drive the conductive coupling devices 570 through 589 by way of respective current limiting resistors 550 through 569. The result is a patterned timely coded signal on the said conductive coupling devices wherein further said signal, when in an active state, is represented by a logic "1", or in the example shown, a more positive voltage level.

FIG. 29 shows means I have modeled for providing second apparatus replication indicant drive for light sources 620 through 629 which serve to guide the student through the interrogatory statements in an "one at a time" manner. The said counter, decoder 337' driven as described for FIG. 8, serves to sequentially drive indicants 620 through 629 through NPN transistors 600 through 609, base resistors 610 through 619, and should the indicants 620 through 629 be light emitting diodes or like devices, current ballast resistors 630 through 639 are shown.

The exercise of my new teachings describes particular circuit functions, including certain unique integrated circuit devices, but this shall in no way infer that the practice of my art in another form is still not within the scope of my invention as described and claimed.

The artisian is guided to certain integrated circuit functions in my specification. These devices are well described in popular literature. Certain particular devices I have found useful to fulfill my circuit requirements include:

| | | |
|---|---|---|
| NAND-gate, | 2-input | CD4011 |
| NAND-gate, | 3-input | CD4023 |
| NAND-gate, | 8-input | CD4068 |
| NOR-gate, | 2-input | CD4001 |
| AND-gate, | 2-input | CD4081 |
| OR-gate, | 2-input | CD4071 |
| EXCLUSIVE-OR-gate, | | CD4070 |
| Counter-decoder 326, 337, 439 | | CD4017 |
| BCD-Counters 411, 426 | | CD4518 |
| 4:7 decoder 155, 413, 428 CD4511 | | |
| Inverters | | CD4069 |
| Power Inverter-Buffers | | CD4049 |
| "D" Flipflops 189, 190, 318, 414, 428, 440 | | CD4013 |
| 7-segment displays 416, 422, 424, 430, 435, 437 | | MAN-4740 |
| NPN transistors | | 2N4124 |
| PNP transistors | | 2N4126 |
| Voltage Regulator | | uA7808 |

The integrated circuits shown are of CMOS construction, the artisian is howerver instructed that the teachings of this invention are in no way limited to one technology form. While not particularly shown in the drawings, the artisian practicing my instant invention is instructed to connect proper operating voltages and currents to all the circuit functions as is customary usage.

While I have described my first apparatus in a certain, preferred embodiment, an artisian might emply other first apparatus form contigent only on the ability of the selected form to be cooperative with the second apparatus said coupling device and the third apparatus said portable coupling means said cooperative coupling mode. This is to say that the said first apparatus overlay material may be of any of a variety of constructions aside from paper, exampledly including synthetic or plastic materials, cloth, and various glasses.

My second apparatus has been described in one form suited for a particular application of my herein taught art. This representation in no way intends to restrict my apparatus from being constructed, or manufactured, in any of a variety of other more particular embodiments, be the form portable or substantially stationary.

My third apparatus embodiment is shown, for my illustrative preferred embodiment, as a pen-like hand held device. This serves to illustrate one particular example of my said portable coupling means which has been found particularly applicable in the everyday utility of my new art, but is not intended to infer any limitation to this form alone.

This invention is described using photoelectric or contactual coupling modes betwixt the said second apparatus coupling devices and the said third apparatus coupling means. An artisian, in applying the teachings of my invention, may be expected to conceive the use of my invention with other coupling modes, however, and still be within the scope of the novelty of my invention. As for example, acoustical, electrostatic, inductive, or press-switch coupling modes are all considered by me to be useful. For example, press switch coupling might mean that the first apparatus overlays the second apparatus means as herein illustrated. The student could complete the coupling mode by way of depressing the correct replication with an instrument, including his finger, which will activate a switch function in the second apparatus which lies directly beneath the selected answer.

I claim:

1. Didactic means for providing a learning experience, comprising:

a. a first apparatus consisting of at least one interrogatory document containing a first instruction means and a second instruction means, wherein said first instruction consists of at least one examinative statement together with at least two different replication selections, wherein further said second instruction consists of indicia denotive of the correct replication selection for the said examinative statement;

b. a second apparatus means consisting of:

ba. support conformation means for accepting singular placement of the said first apparatus interrogatory document and thereby positioning the said first instruction means for easy viewing by an operator;

bb. receptor means contained integral with the said support means, whereby the said receptor is cooperatively positioned in relation to the said, thereupon placed, interrogatory document second instruction means so as to interact with the said indicia in a manner operative to produce a denotive first signal at an output means;

bc. a second signal generative means for producing a succession of timely coded signals at a plurality of outputs;

bd. a plurality of second signal coupling devices cooperatively coupled to the said second signal generative means plural outputs;

be. an arrangement of said coupling devices which is purposefully located in the said support means as to underlie, or be subjacent to, the area upon the said first apparatus interrogatory document whereon the said replication selections are positioned and further wherein the individual coupling mode for each of the said coupling devices is particularly caused to fall upon the reverse, or back, side of and extend through the said first apparatus document;

c. a third apparatus consisting of a portable coupling means, cooperatively interconnected with the said second apparatus means, which may be selectively positioned by an operator so as to intercept and be mutually interactive with any one of the said second coupling devices, wherein the said coupling mode is caused to pass through the said first apparatus document, thereby producing a third signal at an output terminal;

d. a fourth apparatus comparative means consisting of an ordered arrangement of electrical devices connected with and operative so as to combine the said denotive first signal produced by the said second apparatus receptor means output coactively with the said third signal produced by the said third apparatus portable coupling means output so as to produce, in combination with the cooperatively coupled said second signal, a fourth signal at an output terminal means which is indicative of the exactitude of the choice of said operator's placement of the said third apparatus portable coupling means in relation to any one of the said various second apparatus second signal coupling means, the effects of which have been caused to pass through the said first apparatus interrogatory document replication selections associated with the thereupon appearing first instruction means.

2. Didactic means for providing tutorial activity, comprising:
   a. a first apparatus consisting of at least one interrogatory document containing a first instruction means and a second instruction means wherein said first instruction consists of at least one interrogative statement together with at least two alternative responses, and wherein further said second instruction consists of several ciphers indicative of the correct alternative response selection for the said interrogative statement;
   b. a second apparatus means consisting of:
      ba. support conformation means for accepting singular placement of the said first apparatus interrogatory document and thereby placing the said first instruction means in a position for easy viewing by an operator;
      bb. receptor means contained as a part of said support means adjacent to said placed first apparatus interrogatory document wherein said receptor means is operative to respond to said second instruction means cipheric indication and thereby cause a denotive first signal to be produced at the output of the said receptor means;
      bc. a source of second signal energy providing a plurality of unique timely coded outputs;
      bd. a plurality of second signal transmissive devices, connected to said source of second signal outputs, which are so located in the support means as to underlie, or be subjacent to, the area upon the said first apparatus interrogatory document whereon the said alternative responses are positioned, and further wherein the individual fields of effect for the said transmissive devices are particularly caused to fall upon the reverse, or back, side of and extend through the said first apparatus document;
   c. a third apparatus consisting of a handheld probe sensor means, cooperatively interconnected with the said second apparatus support conformation means, which may be selectively positioned by an operator so as to intercept and be individually responsive to any one of the said second signal fields of effect caused to extend through the said first apparatus document by the said plurality of second apparatus transmissive devices thereby providing a third signal at an output terminal;
   d. a fourth apparatus comparative means consisting of an ordered arrangement of electrical devices connected with and operative so as to combine the said denotive first signal produced by the said second apparatus receptor means output coactively with the said third signal produced by the said third apparatus probe sensor means output so as to produce, in combination with the cooperatively coupled said second signal, a fourth signal at an output terminal means which is indicative of the exactitude of the choice of said operator's placement of the said third apparatus handheld sensor probe in relation to any one of the said various second apparatus second signal fields of effect which have been caused to pass through the said first apparatus interrogatory document alternative response associated with the thereupon appearing said first instruction means.

3. Didactic apparatus as in claim 1 wherein said first apparatus is a suitably placed sheet of relatively translucent material, containing thereon at least one first instruction means and at least one second instruction means, wherein further said second apparatus said plural coupling devices are electrically gateable visible light sources, mounted subjacent to and caused to transilluminate the overlaid said translucent material with sufficient intensity so as to appear on the said sheet front surface as a visible glow where the light diffuses through the said translucent material, wherein further the said third apparatus portable coupling means is a pen-like handheld probe containing a light sensor, which may be selectively placed in a responsive position by the operator over any one of the plural positions on the said first apparatus translucent material where the said gated light sources cause a diffused glow to appear.

4. Didactic aparatus as in claim 2 wherein said first apparatus is a suitably placed sheet of relatively translucent material, containing thereon at least one first instruction means and at least one second instruction means, wherein further said second apparatus said plural coupling devices are electrically gateable visible light sources, mounted subjacent to and caused to transilluminate the overlaid said translucent material with sufficient intensity so as to appear on the said sheet front surface as a visible glow where the light diffuses through the said translucent material, wherein further the said third apparatus portable coupling means is a pen-like handheld probe containing a light sensor, which may be selectively placed in a responsive position by the operator over any one of the plural positions on the said first apparatus translucent material where the said gated light sources cause a diffused glow to appear.

5. First apparatus as in claim 1 wherein said interrogatory document consists of a sheet of thin translucent material, say paper, whereupon is contained the said first instruction in the manner of a written examination, including further that the said replication selections be in the form of at least two multiple choice answers, wherein further that said second instruction indicia be of a form suited for the predeterminate transmittance, or else the interruption, of the light path between a source of light energy and a sensor of light energy.

6. Second apparatus as in claim 2 wherein said receptor means consists of a source of light energy and a sensor of light energy arranged in interactive relationship with the more or less light transmissive indicia provided by the said first apparatus second instruction means.

7. Second apparatus as in claim 1 wherein said second signal generative means, aside from providing a uniquely gated, or keyed, drive signal for each of the said plural outputs, provides for an active condition to occur on all of the said plural outputs for a substantial portion of the timely coded signal pattern cycle, the purpose for which is to sustain a longer than usual operative duty cycle for each of the said plural signal coupling devices operatively connected to the said second signal generative means.

8. Second apparatus as in claim 1 wherein said second signal coupling devices include a semiconductor material, say doped Gallium, which produces at least one band of monochromatic light which is substantially visible to a human operator.

9. Didactic means as in claim 3 wherein said third apparatus said coupling means consists of a photosensitive sensor means responsive so as to produce an electrical signal when caused to be illuminated by the said second apparatus said coupling device said coupling modes.

10. Didactic means as in claim 1 wherein said fourth signal output is connected to a tally means for the purpose of displaying, for the operator, a score indicating the correctitude of the selected replications.

11. Didactic means as in claim 1 wherein said fourth signal output drives an indicant means, wherein furthr said indicant means includes an audio sounder means which emits a brief sensory audible tone of first pitch for a RIGHT response, whilst a brief sensory audible tone of second pitch emits for a WRONG response.

12. Didactic means as in claim 1 wherein said receptor means includes a first signal program patch memory means including a first signal decoder for the purpose of providing a plurality of replication response pattern combinations, albeit preset, from any one of the plural said second instruction indicia combinations.

13. Didactic means as in claim 1 wherein said first apparatus said first instruction means consists of a plurality of interrogatory statements, including an attendent plurality of replication responses, and wherein further the said second apparatus provides means for accepting said first apparatus as an overlay, and wherein further second apparatus includes means in the form of a plurality of visible light sources which serve to transilluminate the said first apparatus in the area upon the said first apparatus wherein the said replication responses are located, and further wherein said second apparatus light sources are caused to be lighted in a varied pattern so as to denote the said interrogatory statement and said attendent replications the operator is momentarily expected to answer.

14. Didactic means as in claim 1 wherein said second apparatus said second signal coupling device and the said third apparatus said coupling means form a direct, electrically conductive, contact closure when brought together by the operator for the purpose of signalling the particular operator selected replication to the said fourth apparatus comparative means.

* * * * *